(12) United States Patent
Inoue et al.

(10) Patent No.: US 10,608,273 B2
(45) Date of Patent: Mar. 31, 2020

(54) POLYMER ELECTROLYTE MEMBRANE

(71) Applicants: ASAHI KASEI KABUSHIKI KAISHA, Tokyo (JP); DAIKIN INDUSTRIES, LTD., Osaka-shi, Osaka (JP)

(72) Inventors: Yuichi Inoue, Tokyo (JP); Kuon Miyazaki, Tokyo (JP); Norihito Tanaka, Tokyo (JP); Kentaro Kikuchi, Tokyo (JP); Nobuki Uraoka, Settsu (JP); Shinichi Chaen, Settsu (JP); Tomohisa Konishi, Settsu (JP); Tadashi Ino, Settsu (JP)

(73) Assignees: ASAHI KASEI KABUSHIKI KAISHA, Tokyo (JP); DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/100,010

(22) PCT Filed: Dec. 1, 2014

(86) PCT No.: PCT/JP2014/081795
§ 371 (c)(1),
(2) Date: May 27, 2016

(87) PCT Pub. No.: WO2015/080294
PCT Pub. Date: Jun. 4, 2015

(65) Prior Publication Data
US 2017/0012313 A1    Jan. 12, 2017

(30) Foreign Application Priority Data
Nov. 29, 2013  (JP) ................ 2013-248729

(51) Int. Cl.
*H01M 8/1004* (2016.01)
*H01M 8/1023* (2016.01)
*H01M 8/1027* (2016.01)
*H01M 8/1039* (2016.01)
*H01M 8/106* (2016.01)
*H01M 8/1062* (2016.01)
*H01M 8/1067* (2016.01)
*H01M 8/1018* (2016.01)
*H01B 1/12* (2006.01)
*C08F 214/26* (2006.01)
*C08F 216/14* (2006.01)
*C08J 5/22* (2006.01)

(52) U.S. Cl.
CPC ....... *H01M 8/1004* (2013.01); *C08F 214/262* (2013.01); *C08F 216/14* (2013.01); *C08J 5/2237* (2013.01); *H01B 1/122* (2013.01); *H01M 8/106* (2013.01); *H01M 8/1023* (2013.01); *H01M 8/1027* (2013.01); *H01M 8/1039* (2013.01); *H01M 8/1062* (2013.01); *C08F 2216/1483* (2013.01); *C08J 2327/18* (2013.01); *C08J 2427/12* (2013.01); *C08J 2427/18* (2013.01); *H01M 8/1067* (2013.01); *H01M 2008/1095* (2013.01); *H01M 2300/0082* (2013.01)

(58) Field of Classification Search
None
See application file for complete search history.

(56) References Cited

U.S. PATENT DOCUMENTS

| | | |
|---|---|---|
| 5,234,739 A | 8/1993 | Tanaru et al. |
| 5,547,551 A | 8/1996 | Bahar et al. |
| 5,795,668 A | 8/1998 | Banerjee |
| 5,945,192 A * | 8/1999 | Kato ............... B01D 61/52 204/518 |
| 6,054,230 A | 4/2000 | Kato |
| 6,177,533 B1 | 1/2001 | Woodward |
| 6,541,589 B1 | 4/2003 | Baillie |
| 7,670,720 B1 | 3/2010 | Buerger et al. |
| 2002/0071980 A1 | 6/2002 | Tabata et al. |
| 2002/0161149 A1 | 10/2002 | Kobayashi et al. |
| 2003/0008198 A1 | 1/2003 | Mukoyama et al. |
| 2005/0025684 A1 | 2/2005 | Jethrow et al. |
| 2005/0186461 A1 | 8/2005 | Hommura et al. |
| 2006/0068258 A1 | 3/2006 | Kinoshita |
| 2007/0009727 A1 | 1/2007 | Sawada et al. |
| 2007/0135558 A1 | 6/2007 | Tsuda et al. |
| 2008/0083499 A1 | 4/2008 | Nodono |
| 2008/0200571 A1 | 8/2008 | Higuchi et al. |
| 2009/0234032 A1 | 9/2009 | Kimishima |
| 2009/0246592 A1* | 10/2009 | Kinoshita ........ H01M 8/0291 429/483 |
| 2009/0281231 A1 | 11/2009 | Kasai et al. |
| 2010/0160510 A1 | 6/2010 | Aten et al. |
| 2011/0008708 A1 | 1/2011 | Akita et al. |
| 2011/0020728 A1 | 1/2011 | Kita et al. |
| 2011/0027688 A1 | 2/2011 | Hommura et al. |
| 2011/0039960 A1 | 2/2011 | Xu et al. |
| 2011/0040054 A1 | 2/2011 | Higuchi et al. |
| 2012/0028046 A1 | 2/2012 | Ono et al. |

(Continued)

FOREIGN PATENT DOCUMENTS

| | | |
|---|---|---|
| CN | 1072351 A | 5/1993 |
| CN | 1033428 C | 12/1996 |

(Continued)

OTHER PUBLICATIONS

Communication dated Apr. 7, 2017, from the European Patent Office in counterpart European Application No. 14865872.7.

(Continued)

*Primary Examiner* — Sin J Lee
(74) *Attorney, Agent, or Firm* — Sughrue Mion, PLLC

(57) ABSTRACT

The present invention provides a polymer electrolyte membrane having excellent strength, a small dimensional change, and a low membrane resistance. The polymer electrolyte membrane includes a porous film and a polymer electrolyte. The porous film has a fibril/node area ratio of 90/10 to 75/25.

8 Claims, 9 Drawing Sheets

(56) References Cited

U.S. PATENT DOCUMENTS

| | | |
|---|---|---|
| 2013/0040142 A1 | 2/2013 | Frey et al. |
| 2013/0172477 A1 | 7/2013 | Hintzer et al. |
| 2013/0183515 A1 | 7/2013 | White |
| 2013/0267621 A1 | 10/2013 | Sawada et al. |
| 2013/0281558 A1 | 10/2013 | Sawada et al. |
| 2014/0200310 A1 | 7/2014 | Taira et al. |
| 2014/0343239 A1 | 11/2014 | Higuchi et al. |
| 2015/0082757 A1 | 3/2015 | Chaen et al. |
| 2015/0299341 A1 | 10/2015 | Nanba |
| 2016/0289361 A1 | 10/2016 | Yamanaka et al. |
| 2017/0001155 A1* | 1/2017 | Chaen .................. B01J 20/261 |
| 2017/0002156 A1* | 1/2017 | Chaen .................. C08J 5/18 |
| 2017/0005354 A1 | 1/2017 | Inoue et al. |

FOREIGN PATENT DOCUMENTS

| | | |
|---|---|---|
| CN | 1685548 A | 10/2005 |
| CN | 101771153 A | 7/2010 |
| CN | 104884476 A | 9/2015 |
| EP | 0 661 336 A1 | 7/1995 |
| EP | 1 560 284 A1 | 8/2005 |
| EP | 3 061 512 A1 | 8/2016 |
| JP | 5-202217 A | 8/1993 |
| JP | 8-162132 A | 6/1996 |
| JP | 11-501961 A | 2/1999 |
| JP | 11-240917 A | 9/1999 |
| JP | 2000-143727 A | 5/2000 |
| JP | 2002-201217 A | 7/2002 |
| JP | 3552686 B2 | 8/2004 |
| JP | 2005-520002 A | 7/2005 |
| JP | 2006-49002 A | 2/2006 |
| JP | 2006-504848 A | 2/2006 |
| JP | 2008-512551 A | 4/2008 |
| JP | 4402625 B2 | 1/2010 |
| JP | 2010-58026 A | 3/2010 |
| JP | 4951970 B2 | 6/2012 |
| WO | 96/28242 A1 | 9/1996 |
| WO | 96/28501 A1 | 9/1996 |
| WO | 03/022912 A2 | 3/2003 |
| WO | 03/033555 A1 | 4/2003 |
| WO | 2004/041529 A1 | 5/2004 |
| WO | 2005/042593 A1 | 5/2005 |
| WO | 2005/061567 A1 | 7/2005 |
| WO | 2006/031456 A1 | 3/2006 |
| WO | 2007/005361 A1 | 1/2007 |
| WO | 2007/011492 A1 | 1/2007 |
| WO | 2007/024762 A2 | 3/2007 |
| WO | 2007/046345 A1 | 4/2007 |
| WO | 2007/069714 A1 | 6/2007 |
| WO | 2009/001894 A1 | 12/2008 |
| WO | 2009/116446 A1 | 9/2009 |
| WO | 2009/142080 A1 | 11/2009 |
| WO | 2010076661 A1 | 7/2010 |
| WO | 2010/110851 A2 | 9/2010 |
| WO | 2010/113950 A1 | 10/2010 |
| WO | 2012/033804 A1 | 3/2012 |
| WO | 2013/027850 A1 | 2/2013 |
| WO | 2013/115278 A1 | 8/2013 |
| WO | 2013/157647 A1 | 10/2013 |

OTHER PUBLICATIONS

Database WPI, Week 200572; Thomas Scientific, London, GB, XP-002768565 & WO 2005/090480 (4 pages total). dated Sep. 29, 2005.
Communication dated Apr. 19, 2017, from the European Patent Office in counterpart European Application No. 14865651.5.
International Search Report for PCT/JP2014/081795 dated Mar. 3, 2015.
International Search Report dated Feb. 24, 2015 from the International Searching Authority in counterpart International Application No. PCT/JP2014/081779.
International Search Report dated Mar. 3, 2015 from the International Searching Authority in counterpart International Application No. PCT/JP2014/081771.
International Search Report dated Mar. 10, 2015 from the International Searching Authority in counterpart International Application No. PCT/JP2014/081775.
International Search Report dated Mar. 10, 2015 from the International Searching Authority in counterpart International Application No. PCT/JP2014/081777.
International Preliminary Report on Patentability dated Jun. 28, 2016 from the International Bureau in counterpart International Application No. PCT/JP2014/081795.
International Preliminary Report on Patentability dated May 31, 2016 from the International Bureau in counterpart International Application No. PCT/JP2014/081779.
International Preliminary Report on Patentability dated May 31, 2016 from the International Bureau in counterpart International Application No. PCT/JP2014/081771.
International Preliminary Report on Patentability dated May 31, 2016 from the International Bureau in counterpart International Application No. PCT/JP2014/081775.
International Preliminary Report on Patentability dated May 31, 2016 from the International Bureau in counterpart International Application No. PCT/JP2014/081777.
U.S. Appl. No. 15/100,048, Yuichi Inoue, filed May 27, 2016.
U.S. Appl. No. 15/038,307, Taku Yamanaka, filed May 20, 2016.
U.S. Appl. No. 15/100,002, Shinichi, filed May 27, 2016.
U.S. Appl. No. 15/100,013, Shinichi Chaen, filed May 27, 2016.
Communication dated Nov. 27, 2017 from the United States Patent and Trademark Office in related U.S. Appl. No. 15/100,048.
Office Action dated May 15, 2018, which issued during the prosecution of U.S. Appl. No. 15/038,307.
Office Action dated May 31, 2018, which issued during the prosecution of U.S. Appl. No. 15/100,002.
Communication dated Dec. 17, 2018 from the United States Patent and Trademark Office in U.S. Appl. No. 15/038,307.
Communication dated Jan. 31, 2019 from the United States Patent and Trademark Office in U.S. Appl. No. 15/100,013.
Communication dated Feb. 6, 2019 from the United States Patent and Trademark Office in U.S. Appl. No. 15/100,002.
Communication dated May 1, 2019 from the United States Patent and Trademark Office in related U.S. Appl. No. 15/100,048.
Communication dated Nov. 29, 2018, from United States Patent and Trademark Office in related U.S. Appl. No. 15/100,048.
Communication dated Oct. 18, 2019 from the United States Patent and Trademark Office in Counterpart U.S. Appl. No. 15/100,048.
Communication dated Oct. 17, 2019 from the United States Patent and Trademark Office in Counterpart U.S. Appl. No. 15/100,013.
Communication dated Jul. 10, 2019 from the United States Patent and Trademark Office of co-pending U.S. Appl. No. 15/100,013.
Communication dated Jul. 16, 2019 from the United States Patent and Trademark Office of co-pending U.S. Appl. No. 15/038,307.
Communication dated Jul. 18, 2019 from the United States Patent and Trademark Office of co-pending U.S. Appl. No. 15/100,002.
Communication dated May 22, 2017 from the European Patent Office in counterpart Application No. 14866220.8.
Communication dated May 24, 2017 from the European Patent Office in counterpart Application No. 14865899.0.
Communication dated Jun. 2, 2017 from the European Patent Office in counterpart Application No. 14865549.1.
Hongwei Zhang, et al.; "Recent Development of Polymer Electrolyte Membranes for Fuel Cells"; Chemical Reviews; vol. 112, No. 5, May 9, 2012; pp. 2780-2832; XP055375431.
Pattabiraman Krishnamurthy et al.; "Performance of a 1kW Class Nafion-PTFE Composite Membrane Fuel Stack"; International Journal of Chemical Engineering, vol. 2012, Article ID 512803; pp. 1-8.
Michael Wikol et al.; "Expanded Polytetrafluoroethylene Membranes and Their Applications"; Extracted from Filtration and Purification in the Biopharmaceutical Industry, Second Edition; W.L. Gore & Associates, Inc.; Chapter 23, pp. 619-640 (Feb. 2008).
Xinmin Hao et al.; "Studies on Porous and Morphological Structures of Expanded PTFE Membrane Through Biaxial Stretching Technique"; INJ Summer 2005; pp. 31-38.

(56) References Cited

OTHER PUBLICATIONS

Communication dated Jan. 23, 2018 from the U.S. Patent and Trademark Office in counterpart U.S. Appl. No. 15/038,307.
Office Action dated Apr. 10, 2018, which issued during the prosecution of U.S. Appl. No. 15/100,048.
Office Action dated Dec. 4, 2019 issued in U.S. Appl. No. 15/038,307.
Office Action dated Jan. 31, 2020 in U.S. Appl. No. 15/100,048.

* cited by examiner 13  14  15  16  17  18

POLYMER ELECTROLYTE MEMBRANE

CROSS REFERENCE TO RELATED APPLICATIONS

This application is a National Stage of International Application No. PCT/JP2014/081795 filed Dec. 1, 2014, claiming priority based on Japanese Patent Application No. 2013-248729 filed Nov. 29, 2013, the contents of all of which are incorporated herein by reference in their entirety.

TECHNICAL FIELD

The present invention relates to polymer electrolyte membranes.

BACKGROUND ART

Fuel cells are devices that directly convert the chemical energy of a fuel into electric energy through electrochemical oxidization of the fuel, such as hydrogen or methanol, in the cells and provide the electric energy. Thus, they draw attention as clean electric energy sources. In particular, polymer electrolyte fuel cells work at a lower temperature than other fuel cells, and thus are expected to be used in alternative power sources for automobiles, cogeneration systems for individual family homes, portable generators, and other applications.

Such polymer electrolyte fuel cells are each provided with at least a membrane electrode assembly including an electrolyte membrane and gas diffusion electrodes, each of which is composed of a laminate of an electrode catalyst layer and a gas diffusion layer, bonded to both surfaces of the electrolyte membrane. The electrolyte membrane mentioned here is a material having a strong acid group such as a sulfonic acid group or a carboxylic acid group in the polymer chain and having an ability to selectively allow protons to pass therethrough.

Polymer electrolyte membranes are used in fuel cells in environments where the amount of water varies. However, the polymer electrolyte membranes swell with water to show a great dimensional change, and thus they need improvement in durability and reliability. In order to reduce such a dimensional change, various ways of embedding a reinforcing membrane in the electrolyte are proposed.

For example, Patent Literature 1 discloses a composite membrane for polymer electrolyte fuel cells, comprising: (a) a stretched, expanded polytetrafluoroethylene membrane having a first main surface and a second main surface, having a microstructure of polymer fibrils and having a thickness of 0.06 mil (1.5 μm) to 0.8 mil (20 μm) and an average pore size of 0.05 to 0.4 μm; and (b) an ion exchange material impregnated throughout the microstructure of the membrane, the impregnated stretched, expanded polytetrafluoroethylene having a Gurley number of greater than 10,000 seconds, wherein the ion exchange material substantially impregnates the membrane so as to render the first main surface, the second main surface, and the whole of an interior volume of the membrane substantially uniformly occlusive.

Patent Literature 2 discloses an electrochemical cell membrane comprised of a composite membrane comprised of expanded polytetrafluoroethylene and ion exchange polymer as matrix polymer, the expanded polytetrafluoroethylene being made from polytetrafluoroethylene fine powder having a standard specific gravity (SSG) of no more than about 2.16, a breaking strength of at least about 5.5 lb force (24.5 N), and a stress-relaxation time of at least about 500 sec.

Patent Literature 3 discloses a composite membrane comprising (a) an expanded polytetrafluoroethylene membrane having an internal microstructure consisting essentially of nodes interconnected by fibrils, the nodes aligned substantially in parallel, being highly elongated and having an aspect ratio of 25:1 or greater; and (b) an ion exchange material impregnated throughout the membrane, the impregnated expanded polytetrafluoroethylene membrane having a Gurley number of greater than 10,000 seconds, wherein the ion exchange material substantially impregnates the membrane so as to render an interior volume of the membrane substantially occlusive.

Patent Literature 4 discloses a composite comprising a porous polymeric membrane, wherein the porosity of the membrane is at least partially filled with resin, the resin having a room temperature flexural modulus of greater than about 1 GPa, and wherein the membrane satisfies the following equation: 75 MPa<(longitudinal membrane tensile modulus+transverse membrane tensile modulus)/2. Patent Literature 4 includes no description about polymer electrolyte membranes.

CITATION LIST

Patent Literature

Patent Literature 1: JP 4402625 B
Patent Literature 2: JP 2008-512551 T
Patent Literature 3: JP 2005-520002 T
Patent Literature 4: JP 2006-504848 T

SUMMARY OF INVENTION

Technical Problem

Conventional techniques use a porous film as a reinforcing membrane. Here, in order to maintain the strength of a porous film, the porous film needs to be dense and have a small pore size. However, such a porous film cannot be filled with a large amount of polymer electrolyte. Thus, the performance of polymer electrolyte membranes needs to be further improved.

In order to maintain the film strength high, the porous film needs to have a large thickness. Thus, it is almost impossible to make polymer electrolyte membranes thin and produce small cells.

An object of the present invention is to provide a polymer electrolyte membrane having excellent strength, a small dimensional change, and a low membrane resistance.

Solution to Problem

The present invention relates to a polymer electrolyte membrane comprising: a porous film; and a polymer electrolyte, the porous film having a fibril/node area ratio of 90/10 to 75/25.

The porous film preferably has a contact angle with a solution of the polymer electrolyte of 50 degrees or smaller.

The polymer electrolyte is preferably a fluoropolymer electrolyte.

The fluoropolymer electrolyte is preferably a copolymer comprising a repeating unit derived from a COOZ or SO$_3$Z group-containing monomer represented by the following formula (I):

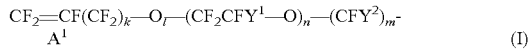

wherein $Y^1$ is F, Cl, or a perfluoroalkyl group; k is an integer of 0 to 2; l is 0 or 1; n is an integer of 0 to 8, n $Y^1$s may be the same as or different from each other; $Y^2$ is F or Cl; m is an integer of 0 to 12, if m=0, l=0 and n=0, m $Y^2$s may be the same as or different from each other; $A^1$ is COOZ or $SO_3Z$, where Z is an alkali metal, an alkaline earth metal, hydrogen, or $NR^1R^2R^3R^4$, where $R^1$, $R^2$, $R^3$, and $R^4$ are each individually a C1-C3 alkyl group or hydrogen, and a repeating unit derived from tetrafluoroethylene.

The porous film preferably has a product of vertical and lateral matrix tensile strengths of $2.20 \times 10^4$ MPa$^2$ or greater.

Preferably, the polymer electrolyte is filled into pores of the porous film, and the porous film is a polytetrafluoroethylene porous film prepared by stretching semi-sintered polytetrafluoroethylene and heat-setting the stretched semi-sintered polytetrafluoroethylene at a temperature of not lower than the melting point of sintered polytetrafluoroethylene.

The porous film preferably has an average pore size of 0.05 μm or greater.

The porous film preferably has a film density of 1.4 g/cm³ or lower.

The porous film preferably has a thickness of smaller than 20 μm.

Preferably, the porous film is a polytetrafluoroethylene porous film, and the polytetrafluoroethylene has a standard specific gravity of 2.160 or lower.

The present invention also relates to a membrane electrode assembly comprising the polymer electrolyte membrane.

The present invention also relates to a polymer electrolyte fuel cell comprising the membrane electrode assembly.

Advantageous Effects of Invention

Since the polymer electrolyte membrane of the present invention has the aforementioned configuration, it has excellent strength, a small dimensional change, and a low membrane resistance.

DESCRIPTION OF EMBODIMENTS

The present invention will be described in detail below.

In the polymer porous film of the present invention, the porous film characteristically has a fibril/node area ratio (area of fibrils/area of nodes) of 90/10 to 75/25. Since the polymer electrolyte membrane of the present invention has the area ratio within the above range, the porous film has excellent strength, as well as a small contact angle with the electrolyte so that the electrolyte well permeates the membrane. As a result, the electrolyte membrane has a small dimensional change and a low membrane resistance.

The fibril/node area ratio can be determined by the following method. First, an image (SEM image, magnification: 1,000× to 5,000×) of a surface of a porous film is taken using a scanning electron microscope (SU8020, product of Hitachi Ltd., vapor deposition is performed with E1030, product of Hitachi Ltd.). This image is imported into a processing apparatus (body: TV image processor TVIP-4100II, product of Nippon Avionics Co., Ltd.; control software: TV image processor image command 4198, product of Ratoc System Engineering Co., Ltd.). The data is divided into nodes and fibrils, so that an image consisting of the nodes and an image consisting of the fibrils are obtained. The fibril/node area ratio is determined from the ratio between the sum of the areas of the fibrils and the sum of the areas of the nodes.

Figure 1:
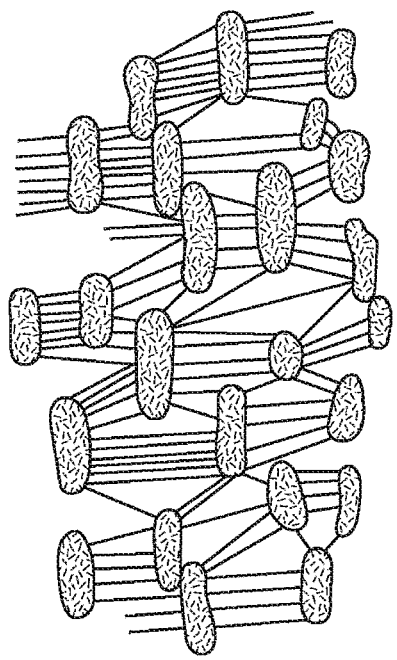
FIG. 1 is a schematic view of one example of nodes.
Figure 2:
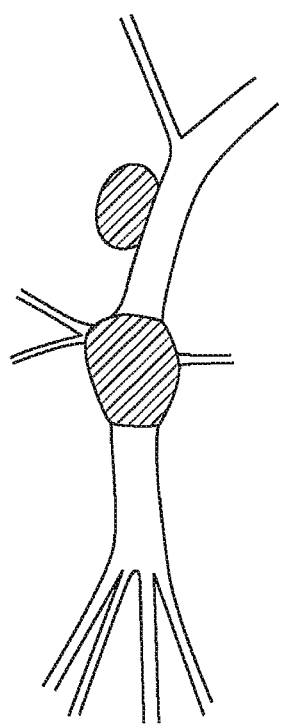
FIG. 2 is a schematic view of one example of nodes.
Figure 3:
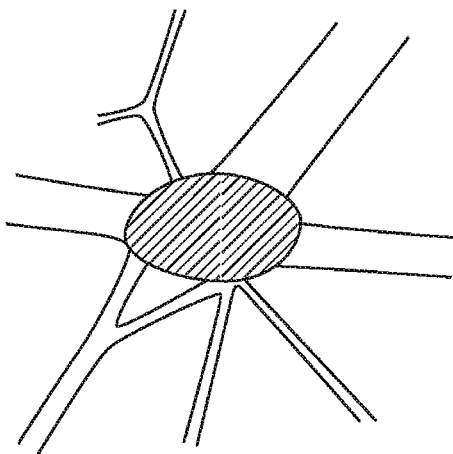
FIG. 3 is a schematic view of one example of a node.
Figure 4:
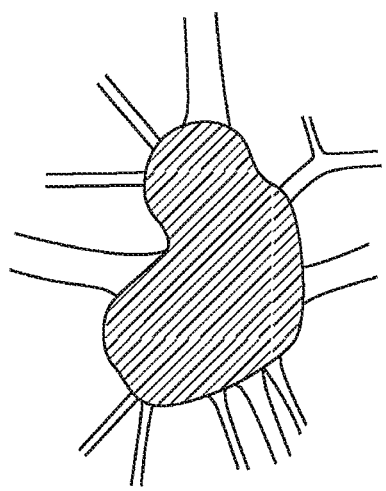
FIG. 4 is a schematic view of one example of a node.
Figure 5:
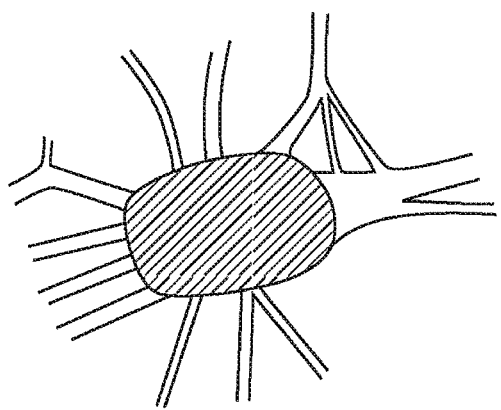
FIG. 5 is a schematic view of one example of a node.
Figure 6:
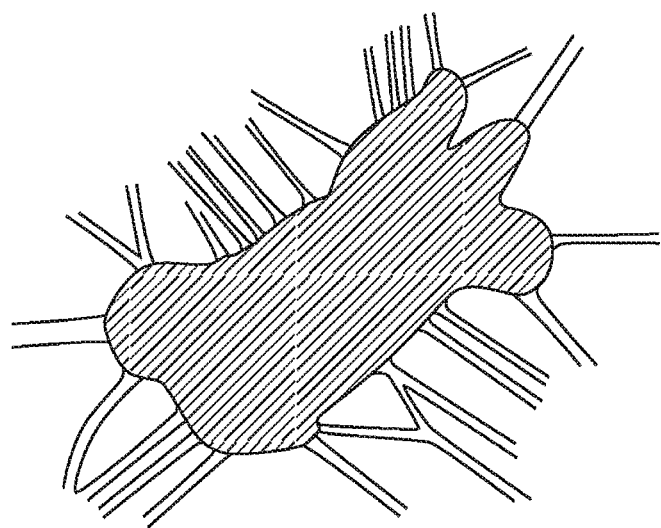
FIG. 6 is a schematic view of one example of a node.
Figure 7:
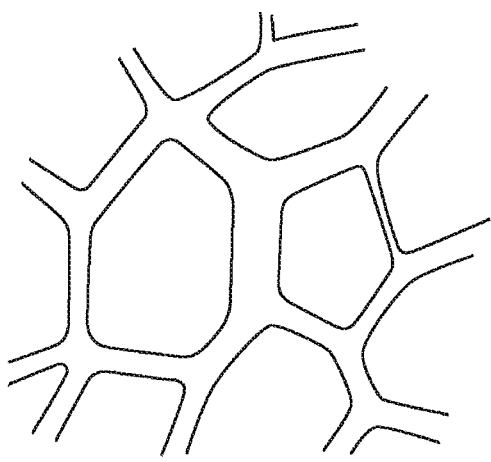
FIG. 7 is a schematic view of one example of portions not treated as nodes.

The node herein means any of the following: (1) a mass to which multiple fibrils connect (FIG. 1: portions filled with dots); (2) a mass which is thicker than the diameters of the connected fibrils (FIG. 2 and FIG. 3: shaded portions); and (3) a mass of primary particles from which fibrils radially extend (FIG. 4, FIG. 5, and FIG. 6: shaded portions). FIG. 7 is one example of portions not treated as nodes. In other words, portions where fibrils are branched out but the fibrils and the intersection have the same diameter are not treated as nodes.

The porous film is preferably a polytetrafluoroethylene porous film.

When non-sintered polytetrafluoroethylene is semi-sintered, the polytetrafluoroethylene shrinks so that the gaps between the polytetrafluoroethylene primary particles are filled, and thereby the number of points where the primary particles are in contact with each other increases. As a result, the S-S curve (a curve showing the relationship between the elongation (%) on the transverse axis and the stress (MPa) on the vertical axis) of the semi-sintered article shows a different shape from that of the non-sintered article. Specifically, in the curve of the non-sintered article, the stress increases as the elongation increases at an early stage of stretching, but once the stress reaches the maximum value at a certain elongation value, it never increases even if the elongation is further increased. In other words, the S-S curve of the non-sintered article has a unique shape in that the stress decreases after it reaches the maximum value. This indicates that the strength of a stretched portion becomes lower than that of a non-stretched portion at a certain point. Thereby, portions (nodes) which remain incompletely stretched are easily produced.

In contrast, the SS curve of the semi-sintered article shows no or a small decrease in the stress after the maximum value. In other words, the aforementioned phenomenon is less likely to occur, so that generation of fibrils is promoted and the number of fibrils is larger than that in a stretched non-sintered article. Thereby, a stretched article having a higher strength can be produced. Such a change in the stretching behavior leads to an effect of decreasing the number of portions (nodes) which remain incompletely stretched in the stretching.

When a scanning electron micrograph is processed and the area ratio between the fibrils and the nodes is determined, a stretched film made from a non-sintered polytetrafluoroethylene tape has a high proportion of nodes and the fibril/node area ratio is generally lower than 75/25. In contrast, a polytetrafluoroethylene porous film prepared by stretching semi-sintered polytetrafluoroethylene and heat-setting the stretched semi-sintered polytetrafluoroethylene at a temperature of not lower than the melting point of sintered polytetrafluoroethylene has a low proportion of nodes and the fibril/node area ratio is 75/25 or higher. This indicates that a larger proportion of the polytetrafluoroethylene constituting the film is transformed into fibrils.

The average fibril diameter and the maximum node area can be determined by the following method. First, an image (SEM image, magnification: 1,000× to 5,000×) of a surface of a porous film is taken using a scanning electron microscope. This image is imported into an image processing apparatus. The data is divided into nodes and fibrils, and an image consisting of the nodes and an image consisting of the fibrils are obtained. The image consisting of the nodes is arithmetically processed so that the maximum node area is determined, and the image consisting of the fibrils is arithmetically processed so that the average fibril diameter is determined (i.e., the total area is divided by ½ of the total perimeter).

The polymer porous film of the present invention includes a porous film and a polymer electrolyte, and the porous film preferably has a contact angle with a solution of the polymer electrolyte of 50 degrees or smaller. The porous film having a contact angle within the above range leads to the aforementioned configuration of the polymer electrolyte membrane of the present invention. Thus, the polymer electrolyte is uniformly filled into the porous film and the polymer electrolyte membrane has excellent strength, a small dimensional change, and a low membrane resistance. The contact angle is more preferably 45 degrees or smaller, still more preferably 40 degrees or smaller.

The polymer electrolyte solution consists of 10 wt % of a perfluorocarbon sulfonic acid resin having an equivalent weight (EW) of 700, 45 wt % of deionized water, and 45 wt % of 1-propanol. Such a test solution can be prepared by adding 1-propanol and deionized water to 20.86 mass % of a perfluorosulfonic acid polymer aqueous solution (trade name: SS700C/20, EW=740, product of Asahi Kasei E-materials Corp.), for example. The contact angle value used is a contact angle measured using a static contact angle meter FM40 Easy Drop (product of KRUSS GmbH) 60 seconds after dropping 5.0 μL of the test solution onto the porous film.

In the polymer electrolyte membrane of the present invention, the polymer electrolyte is preferably filled into pores of the porous film. The polymer electrolyte membrane having this configuration has much better strength, a much smaller dimensional change, and a much lower membrane resistance, and shows much improved performance.

The porous film is preferably produced by stretching semi-sintered polytetrafluoroethylene (PTFE) and heat-setting (thermosetting) the stretched semi-sintered PTFE at a temperature of not lower than the melting point of sintered polytetrafluoroethylene. The polymer electrolyte membrane including the porous film having this configuration has much better strength, a much smaller dimensional change, and a much lower membrane resistance, and shows much improved performance. Even a thin film can achieve a high strength, and thus the polymer electrolyte membrane can be made thin and a small cell can be produced. The term "semi-sintered PTFE" herein means PTFE that has never been heated at a temperature of not lower than the primary melting point but has been heated at a temperature of not lower than the secondary melting point but lower than the primary melting point. The term "non-sintered PTFE" herein means PTFE that has never been heated up to a temperature of not lower than the secondary melting point.

The melting points and the crystal melting curves can be determined using a differential scanning calorimeter. First, a non-sintered PTFE sample is charged into an aluminum pan of the DSC, and the heat of fusion of the non-sintered article and the heat of fusion of the sintered article are determined by the following procedure.

Figure 8:
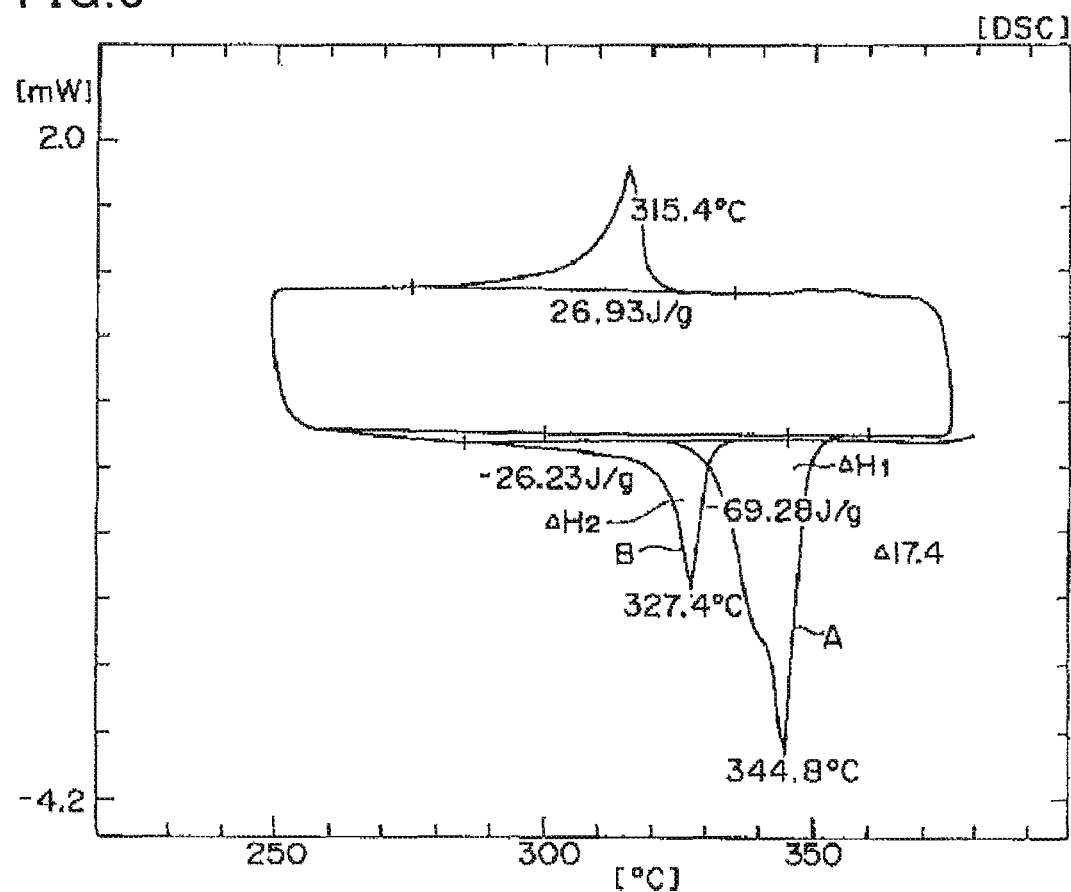
FIG. 8 is a graph showing one example of a crystal melting curve of non-sintered PTFE.

(1) The sample is heated up to 250° C. at a heating rate of 50° C./min, and then heated from 250° C. to 380° C. at a heating rate of 10° C./min. One example of the crystal melting curve recorded in this heating step is a curve A in FIG. 8. The peak of the endothermic curve obtained in this step corresponds to the "melting point (primary melting point) of non-sintered PTFE" or the "melting point (primary melting point) of PTFE fine powder".

(2) Immediately after heated up to 380° C., the sample is cooled down to 250° C. at a cooling rate of 10° C./min.

(3) The sample is again heated up to 380° C. at a heating rate of 10° C./min. One example of the crystal melting curve recorded in the step (3) is a curve B in FIG. 8. The peak of the endothermic curve obtained in the heating step (3) corresponds to the "melting point (secondary melting point) of sintered PTFE".

Figure 9:
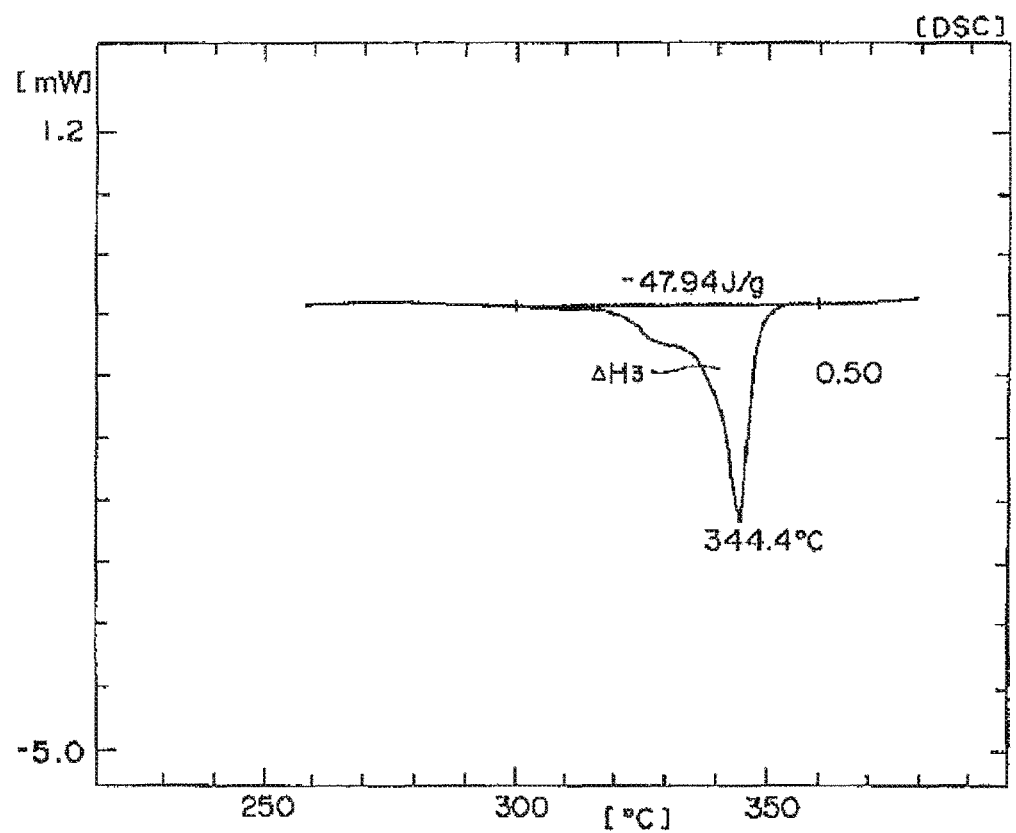
FIG. 9 is a graph showing one example of a crystal melting curve of semi-sintered PTFE.

Next, the crystal melting curve of semi-sintered PTFE is recorded in accordance with the step (1). FIG. 9 shows one example of the curve in this case. The heat of fusion values of the non-sintered PTFE, the sintered PTFE, and the semi-sintered PTFE are each proportional to the area defined by the corresponding endothermic curve and the base line.

The degree of semi-sintering (sintering degree) is calculated by the following formula:

$$\text{Sintering degree} = (\Delta H_1 - \Delta H_3)/(\Delta H_1 - \Delta H_2)$$

wherein $\Delta H_1$ is the heat of fusion of non-sintered PTFE, $\Delta H_2$ is the heat of fusion of sintered PTFE, and $\Delta H_3$ is the heat of fusion of semi-sintered PTFE.

The semi-sintered PTFE is specifically described in JP S59-152825 A, and the present description can also refer to this specific description.

The sintering degree of the semi-sintered PTFE is preferably 0.05 to 0.50, more preferably 0.15 to 0.35. If the sintering degree is too high, nodes may be less likely to be formed and the film pore size may be small. As a result, the contact angle with the electrolyte may be large and problems may occur in processing the electrolyte membrane. If the sintering degree is too low, large nodes may be formed and the effect of improving the strength may be weakened.

The polymer electrolyte membrane comprising a PTFE porous film obtained by stretching semi-sintered PTFE having a sintering degree within the above range has much better strength, a much smaller dimensional change, and a much lower membrane resistance.

Stretching the semi-sintered PTFE can provide stretched PTFE. The stretching of the semi-sintered PTFE can be performed by any known method. The stretching may be performed such that the semi-sintered PTFE is stretched only in the machine direction (MD) to provide a uniaxially stretched article, or may be performed such that the semi-sintered PTFE is first stretched in the machine direction (MD) to provide a uniaxially stretched article, and then the uniaxially stretched article is stretched in the direction perpendicular to the transverse direction (TD) to provide a biaxially stretched article. In order to achieve good impregnation of the electrolyte polymer, it is preferred that the semi-sintered PTFE is first stretched in the machine direction (MD) to provide a uniaxially stretched article, and then the uniaxially stretched article is stretched in the transverse direction (TD) to provide a biaxially stretched article.

The porous film is obtained by heat-setting the stretched article, which is obtained by stretching the semi-sintered PTFE, at a temperature of not lower than the melting point of the sintered PTFE. The heat-setting may be performed by heating the stretched article up to a temperature of not lower than the melting point of the sintered PTFE while maintaining the stretched state of the stretched article obtained by stretching the semi-sintered PTFE, and then cooling the article down to room temperature. The stretched article may be a uniaxially stretched article or a biaxially stretched article, and is preferably a biaxially stretched article. The heat-setting temperature (heating temperature with the stretched state being maintained) is preferably 300° C. to 420° C., more preferably 350° C. to 400° C.

The PTFE may be not only a homo-polymerized PTFE but also a PTFE obtained by polymerizing TFE and a trace comonomer.

The PTFE obtained by polymerizing TFE and a trace comonomer can provide a biaxially stretched porous film having higher strength and better homogeneity. The trace comonomer is preferably perfluoro(methyl vinyl ether) (PMVE), and the PTFE preferably includes 0.011 mol % or more of a polymerized unit derived from PMVE in all the monomer units. The amount of the polymerized unit derived from PMVE is more preferably 0.015 mol % or more, still more preferably 0.025 mol % or more.

For good homogeneity of the biaxially stretched porous film, the amount of the polymerized unit derived from PMVE is preferably 0.250 mol % or less, more preferably 0.150 mol % or less, still more preferably 0.100 mol % or less, most preferably 0.050 mol % or less.

The PTFE obtained by polymerizing TFE and a trace comonomer may further contain a polymerized unit derived from a monomer other than TFE and PMVE.

Examples of the monomer other than TFE and PMVE include fluoroolefins such as hexafluoropropylene (HFP) and chlorotrifluoroethylene (CTFE); fluoro(alkyl vinyl ethers) having a C1-C5, particularly C1-C3, alkyl group; fluorinated cyclic monomers such as fluorodioxole; perfluoroalkyl ethylenes; and ω-hydroperfluoroolefins.

The amount of a polymer derived from the monomer other than TFE and PMVE is preferably 0.0001 to 0.300 mol %, more preferably 0.010 to 0.100 mol %.

The PTFE obtained by polymerizing TFE and a trace comonomer preferably has an average primary particle size of 150 nm or greater. The average primary particle size is more preferably 180 nm or greater, still more preferably 210 nm or greater, most preferably 220 nm or greater.

The greater the average primary particle size of PTFE is, the more an increase in the paste extrusion pressure is suppressed and the better the moldability is during paste extrusion molding of the PTFE powder. The upper limit may be any value, and may be 500 nm.

The average primary particle size can be determined as follows. Using a PTFE aqueous dispersion obtained by polymerization, a calibration curve is drawn between the transmittance of 550-nm incident light to the unit length of the aqueous dispersion with a polymer concentration of 0.22 mass % and the average primary particle size determined by measuring the Feret diameters in a transmission electron micrograph; the transmittance of the target aqueous dispersion is measured; and then the average particle size is determined on the basis of the calibration curve.

The PTFE obtained by polymerizing TFE and a trace comonomer may have a core-shell structure. The core-shell structured PTFE may be, for example, PTFE whose particles each include a core of a high molecular weight PTFE and a shell of a lower molecular weight PTFE.

Such a PTFE may be PTFE described in JP 2005-527652 T, for example.

In order to provide a biaxially stretched porous film having higher strength and better homogeneity, the PTFE preferably has a standard specific gravity (SSG) of 2.160 or lower. Polytetrafluoroethylene with a SSG of 2.160 or lower is suitable for stretch molding because an extrudate thereof shows a stretching magnification of three times or more. For better stretchability, the SSG is more preferably 2.155 or lower, still more preferably 2.250 or lower, particularly preferably 2.145 or lower.

For suppression of an increase in the paste extrusion pressure and excellent moldability during Paste extrusion molding, the standard specific gravity is preferably 2.130 or higher.

The SSG is a SSG defined in ASTM D4895-89 as a standard for the molecular weight of polytetrafluoroethylene without melt-molding fabricability.

The porous film is a polytetrafluoroethylene porous film prepared by stretching the semi-sintered polytetrafluoroethylene and heat-setting the stretched semi-sintered polytetrafluoroethylene at a temperature of not lower than the melting point of the sintered polytetrafluoroethylene. Thus, the porous film has high strength. In other words, a porous film with a low film density while maintaining a high strength can be obtained.

In order to achieve good impregnation of the electrolyte polymer, the porous film preferably has a film density of 1.40 g/cm$^3$ or lower. The film density is more preferably 1.00 g/cm$^3$ or lower, still more preferably 0.80 g/cm$^3$ or lower.

The film density is a value determined by the following method.

A rectangular sample with a size of 4.0 cm×12.0 cm is cut out, and the mass of the sample is measured using a precision scale, and the film density of the sample is calculated by the following formula based on the measured mass and the thickness.

$$\rho = M/(4.0 \times 12.0 \times t)$$

wherein
 ρ=film density (g/cm$^3$)
 M=mass (g)
 t=thickness (cm).

The measurement and the calculation are performed at three points, and the average value thereof is defined as the film density.

The porosity is a value determined based on the film density and the PTFE true density (2.2 g/cm$^3$) by the following formula:

Porosity=1−(film density/PTFE true density).

In order to impregnate a larger amount of the polymer electrolyte and to improve the performance of the electrolyte membrane, the porous film preferably has an average pore size of 0.05 to 2 μm, more preferably 0.2 to 1.5 μm. The average pore size is still more preferably 0.3 μm or greater but 1.0 μm or smaller, particularly preferably 0.6 μm or smaller.

The average pore size is a mean flow pore size (MFP) measured in conformity with ASTM F316-86.

The porous film preferably has a product of vertical and lateral matrix tensile strengths of 2.20×10$^4$ MPa$^2$ or higher. The product is more preferably 3.00×10$^4$ MPa$^2$ or higher, still more preferably 3.50×10$^4$ MPa$^2$ or higher.

The product of vertical and lateral matrix tensile strengths (matrix strengths product) can be determined from the product of the vertical matrix tensile strength and the lateral matrix tensile strength determined by the following methods.

(Vertical Matrix Tensile Strength)

Five samples are first cut out of the biaxially stretched porous film. Each sample has a dimension of 15.0 cm in the machine direction (longitudinal direction, i.e., paste extruding direction) and 2.0 cm in the transverse direction (width direction, i.e., direction perpendicular to the paste extruding direction). For the five samples, the tensile strength in the machine direction is measured and the maximum loads of the respective five samples are determined.

Then, the largest one and the smallest one of the maximum loads of the five samples are excluded and an average value of the remaining three values is calculated. This average value is defined as the vertical average maximum load.

The matrix tensile strength (vertical) is determined by the following formula using the average maximum load (vertical), the sample width (2.0 cm), the thickness, the PTFE true density (2.2 g/cm$^3$), and the film density.

Matrix tensile strength (vertical)={(average maximum load (vertical))/(2.0×thickness)}/(1−porosity).

(Lateral Matrix Tensile Strength)

Five samples are first cut out of the biaxially stretched porous film. Each sample has a dimension of 2.0 cm in the machine direction (longitudinal direction, i.e., paste extruding direction) and 15.0 cm in the transverse direction (width direction, i.e., direction perpendicular to the paste extruding direction). For the five samples, the tensile strength in the transverse direction is measured and the maximum loads of the respective five samples are determined.

Then, the largest one and the smallest one of the maximum loads of the five samples are excluded and an average value of the remaining three values is calculated. This average value is defined as the lateral average maximum load.

The matrix tensile strength (lateral) is determined by the following formula using the average maximum load (lateral), the sample width (2.0 cm), the thickness, the PTFE true density (2.2 g/cm$^3$), and the film density.

Matrix tensile strength (lateral)={(average maximum load (lateral))/(2.0×thickness)}/(1−porosity).

Based on the matrix tensile strength (vertical) and the matrix tensile strength (lateral), the "product of the vertical and lateral matrix tensile strengths" is calculated.

The tensile strength measurements are performed using a tensile tester equipped with a 50 N load cell at a chuck length of 5.0 cm and a cross-head speed of 300 mm/min.

The thickness of the porous film is preferably smaller than 20 μm, more preferably 15 μm or smaller, still more preferably 10 μm or smaller, particularly preferably 5.0 μm or smaller.

If the thickness is too small, the durability of the polymer electrolyte membrane may be poor. Thus, the thickness of the porous film is preferably 1.0 μm or greater, more preferably 1.5 μm or greater.

The thickness is determined as follows: five porous films are stacked and the total thickness is measured using a thickness meter, and the measured value is divided by 5. The quotient is defined as the thickness of one film.

The porous film can be produced by, for example, a production method including: a paste extrusion step of paste extruding PTFE fine powder comprising the PTFE to provide a paste extrudate; a rolling step of rolling the paste extrudate to provide non-sintered PTFE; a drying step of drying the non-sintered PTFE to remove an extrusion aid; a semi-sintering step of semi-sintering the dried non-sintered PTFE to provide semi-sintered PTFE; a uniaxial stretching step of stretching the resulting semi-sintered PTFE in the machine direction (MD) to provide a uniaxially stretched article; and a biaxial stretching step of stretching the resulting uniaxially stretched article in the transverse direction (TD).

Figure 10:
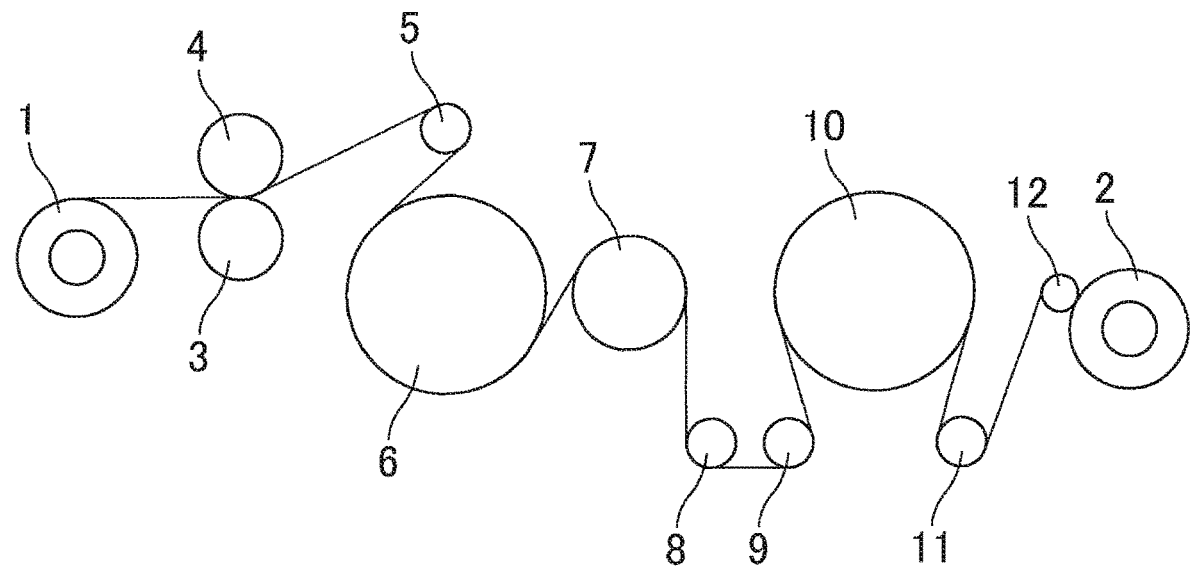
FIG. 10 is a schematic cross-section view of a stretching device equipped with multiple rolls used in a uniaxially stretching step.

The uniaxial stretching step may be performed using a stretching device equipped with multiple rolls as illustrated in FIG. 10, for example.

Figure 11:
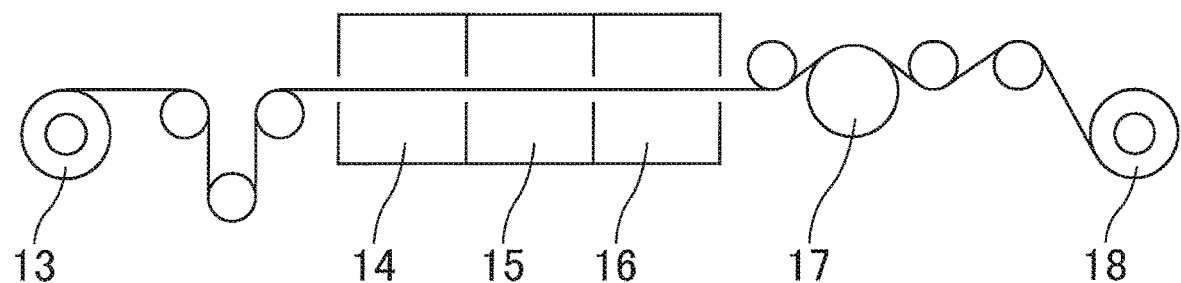
FIG. 11 is a schematic cross-section view of a tenter capable of continuous clipping used in a biaxially stretching step.
Figure 12:
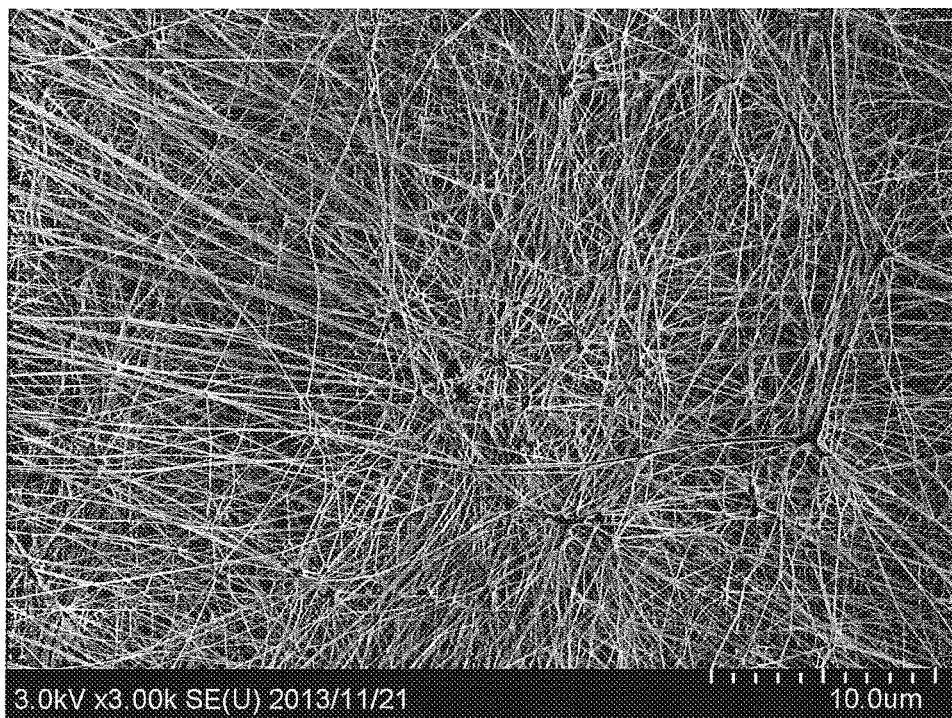
FIG. 12 is a SEM image of a biaxially stretched porous film actually obtained in Example 1.
Figure 13:
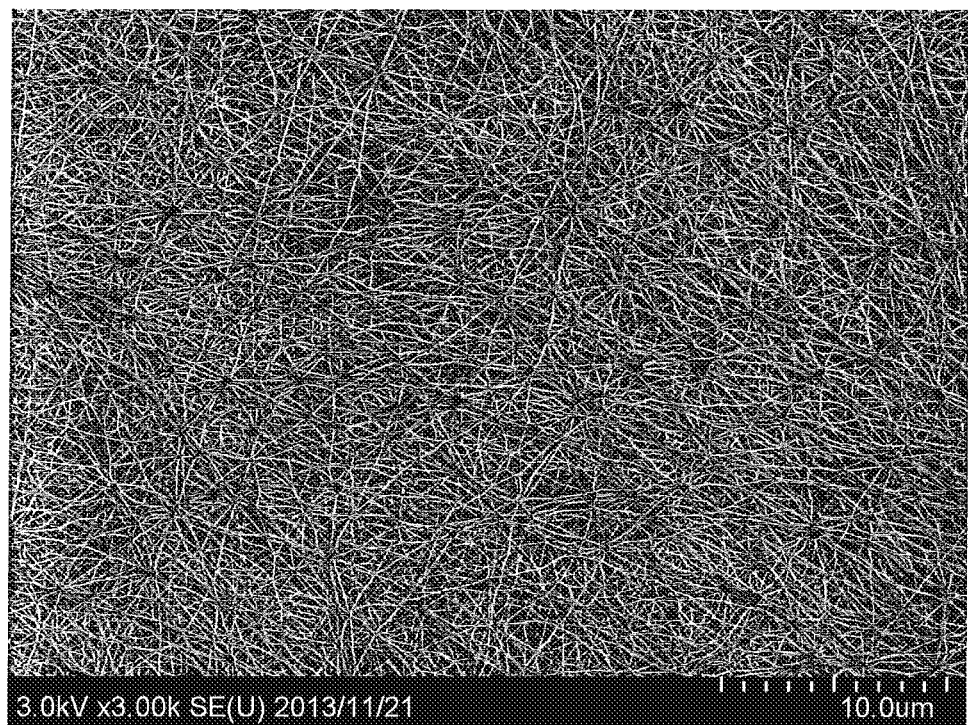
FIG. 13 is a SEM image of a biaxially stretched porous film actually obtained in Example 2.
Figure 14:
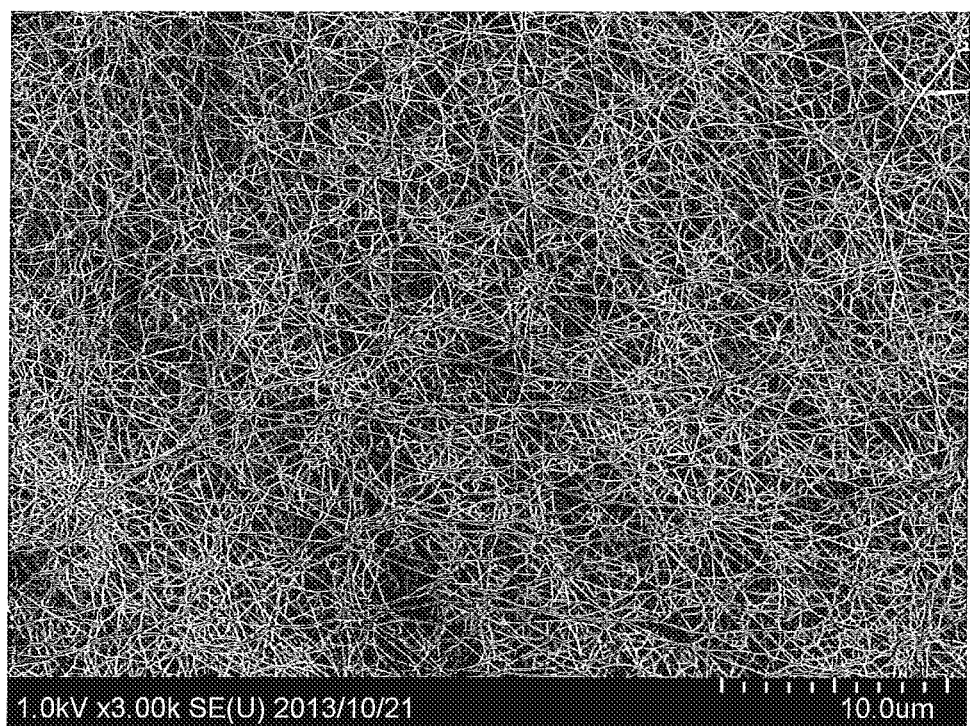
FIG. 14 is a SEM image of a biaxially stretched porous film actually obtained in Example 3.
Figure 15:
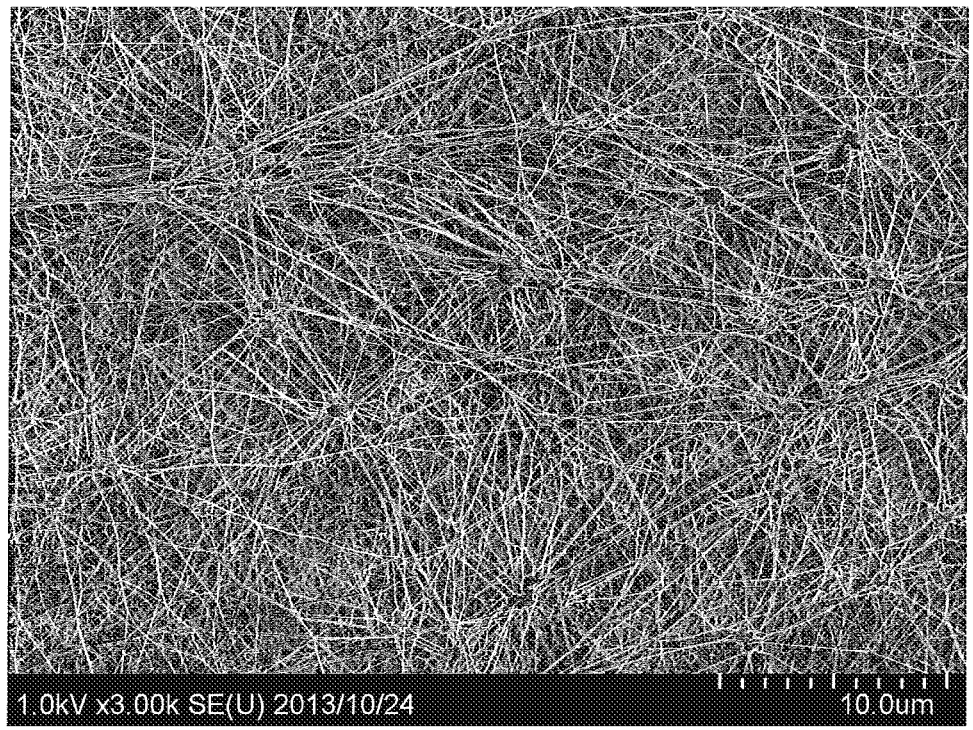
FIG. 15 is a SEM image of a biaxially stretched porous film actually obtained in Comparative Example 1.
Figure 16:
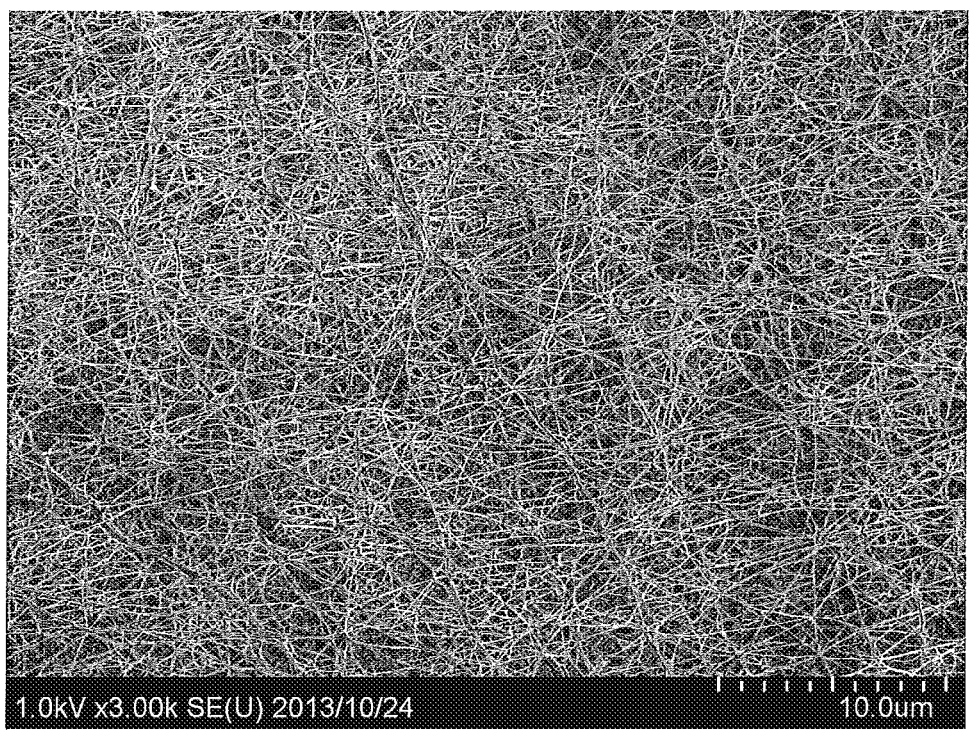
FIG. 16 is a SEM image of a biaxially stretched porous film actually obtained in Comparative Example 2.
Figure 17:
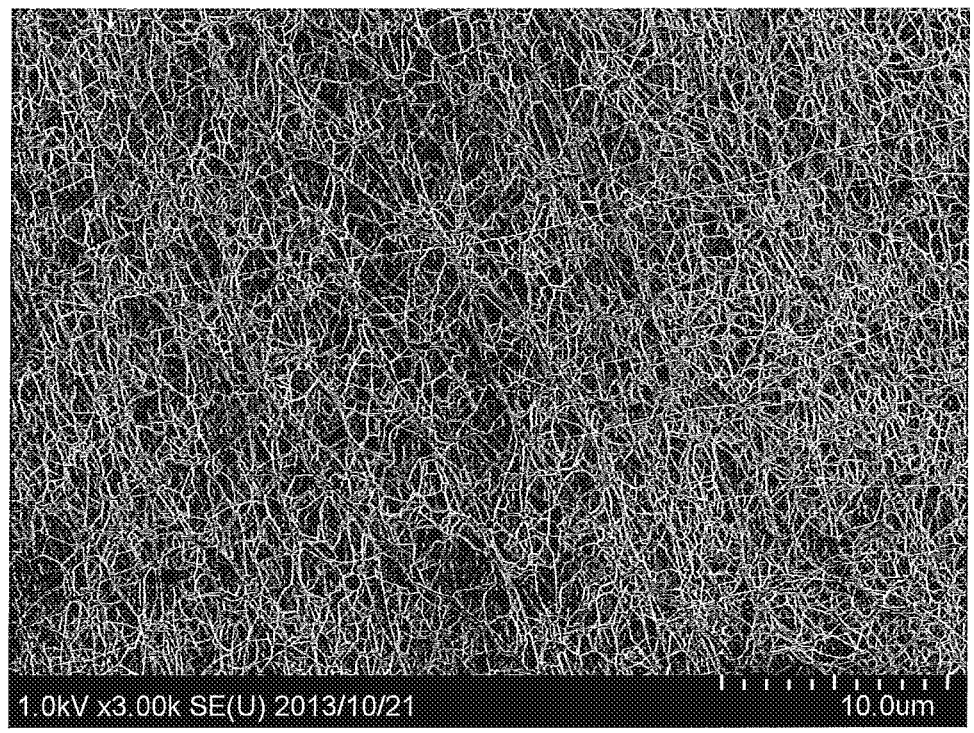
FIG. 17 is a SEM image of a biaxially stretched porous film actually obtained in Comparative Example 3.

The biaxial stretching step may be performed using a tenter capable of continuous clipping as illustrated in FIG. 11, for example.

The above method fibrillates polytetrafluoroethylene, and thereby enables production of a biaxially stretched porous film.

The machine direction (MD) is the same direction as the paste extruding direction in the paste extrusion step. The transverse direction (TD) is a direction perpendicular to the machine direction.

In the above production method, a uniaxially stretched article may be first obtained by stretching in the transverse direction after the rolling step, and then a biaxially stretched article may be obtained by stretching in the machine direction.

Production of the porous film requires no special equipment design, and can be achieved by very usual molding and stretching equipment.

The production method preferably includes, before the paste extrusion step, a step of adding a liquid lubricant such as solvent naphtha or white oil to the PTFE fine powder and mixing the components to provide PTFE fine powder mixed with the liquid lubricant.

The amount of the liquid lubricant is preferably 17 to 34 parts by mass for 100 parts by mass of the PTFE fine powder, although it is in accordance with, for example, the paste extrusion conditions to be mentioned later.

The paste extrusion step is preferably such that a rod-like or sheet-like paste extrudate is obtained using an extruder equipped with a die having a specific diameter or a die capable of providing a sheet-like extrudate.

In the paste extrusion step, the extrusion pressure can be appropriately set in accordance with the extruder used and the extrusion rate, for example.

In order to provide a porous film having high strength and excellent homogeneity, the extrusion temperature in the paste extrusion step is preferably 5° C. to 100° C. The extrusion temperature is more preferably 30° C. to 80° C.

The paste extrusion step is preferably such that the PTFE fine powder is pre-molded to provide a pre-molded article, and then this pre-molded article is extruded through an extruder to provide a rod- or sheet-like paste extrudate.

The rolling temperature in the rolling step is preferably 5° C. to 100° C., more preferably 30° C. to 80° C.

The production method includes a step of drying the resulting non-sintered PTFE after the rolling step. Thereby, the extrusion aid can be removed. If a liquid lubricant is used as mentioned above, the drying can remove the liquid lubricant. The drying temperature is preferably 70° C. to 280° C., more preferably 100° C. to 250° C., although it is in accordance with, for example, the types of an extrusion aid and a liquid lubricant.

The rolling can be performed using a mill roll or a belt press, for example.

The step of providing a semi-sintered PTFE is a step of heating the PTFE at a temperature of not lower than the secondary melting point but lower than the primary melting point.

In order to provide a porous film having a higher strength and to provide a polymer electrolyte membrane having excellent strength, a small dimensional change, and a low membrane resistance, the sintering degree is preferably 0.05 to 0.50, more preferably 0.15 to 0.35. With a sintering degree within the above range, the contact angle with the polymer solution and the fibril/node area ratio of the polymer electrolyte membrane to be finally obtained can be adjusted within the aforementioned respective ranges. If the sintering degree is too high, nodes may be less likely to be formed and the film pore size may be small. On the contrary, if the sintering degree is within the above range, the contact angle with the electrolyte is small and a polymer electrolyte membrane showing excellent performance can be achieved. If the sintering degree is too small, large nodes may be generated. On the contrary, if the sintering degree is within the above range, a polymer electrolyte membrane having high strength can be achieved.

In order to provide a porous film having high strength and excellent homogeneity and to provide a polymer electrolyte membrane having excellent strength, a small dimensional change, and a low membrane resistance, the uniaxial stretching step preferably satisfies a stretch ratio of 2 to 50 times, more preferably 5 to 30 times.

In order to provide a biaxially stretched porous film having high strength and excellent homogeneity, the stretching temperature in the uniaxial stretching step is preferably room temperature to a temperature of lower than the primary melting point, more preferably 200° C. to 330° C., still more preferably 250° C. to 300° C.

In order to provide a porous film having high strength and excellent homogeneity and to provide a polymer electrolyte membrane having excellent strength, a small dimensional change, and a low membrane resistance, the stretching rate in the uniaxial stretching step is preferably 100 to 2,000%/sec, more preferably 200 to 1,000%/sec, still more preferably 300 to 900%/sec.

The uniaxial stretching may be performed by any method. Examples of the method in the industrial context include roll stretching and hot-plate stretching.

In order to provide a porous film having high strength and excellent homogeneity and to provide a polymer electrolyte membrane having excellent strength, a small dimensional change, and a low membrane resistance, the stretch ratio in the biaxial stretching step is preferably 2 to 100 times, more preferably 10 to 50 times.

In order to provide a porous film having high strength and excellent homogeneity and to provide a polymer electrolyte membrane having excellent strength, a small dimensional change, and a low membrane resistance, the stretching temperature in the biaxial stretching step is preferably room temperature to 400° C., more preferably 150° C. to 390° C., still more preferably 200° C. to 380° C.

In order to provide a porous film having high strength and excellent homogeneity and to provide a polymer electrolyte membrane having excellent strength, a small dimensional change, and a low membrane resistance, the stretching rate in the biaxial stretching step is preferably 5 to 1,000%/sec, more preferably 7 to 700%/sec, still more preferably 10 to 600%/sec.

The biaxial stretching may be performed by any method, and may be performed by a method using a tenter, for example.

In order to provide a porous film having high strength and excellent homogeneity and to provide a polymer electrolyte membrane having excellent strength, a small dimensional change, and a low membrane resistance, the production method preferably includes a heat-setting step after the biaxial stretching step. The heat-setting temperature is preferably not lower than the melting point of sintered PTFE, more preferably 300° C. to 420° C., still more preferably 350° C. to 400° C.

The heat-setting step is usually performed by exposing the biaxially stretched article obtained by the biaxial stretching step at a predetermined heat-setting temperature while maintaining the stretched state, keeping this temperature for a predetermined heat-setting time, and then cooling the biaxially stretched article down to about room temperature.

The porous film may be a uniaxially stretched porous film produced without biaxial stretching. Still, in order to achieve good impregnation of the electrolyte polymer, a biaxially stretched porous film is preferred.

The polymer electrolyte can be a known polymer used as a solid polymer electrolyte for polymer electrolyte fuel cells.

The polymer electrolyte may be any one, and is preferably a perfluorocarbon polymeric compound having an ion-exchange group or a hydrocarbon polymeric compound which has an aromatic ring in the molecule, which is partially fluorinated, and to which an ion-exchange group is introduced. For good chemical stability, a perfluorocarbon polymeric compound having an ion-exchange group is more preferred.

The polymer electrolyte preferably has an equivalent weight (EW), i.e., a dry weight per equivalent of the ion-exchange group, of 250 or more and 1500 or less.

The upper limit of the EW value is more preferably 900, still more preferably 700, particularly preferably 600, even more preferably 500.

The lower limit of the EW value is more preferably 250, still more preferably 300, particularly preferably 350, especially preferably 400.

The EW value is preferably smaller because the conductivity becomes higher. In contrast, the solubility in hot water may be disadvantageously high. Thus, the EW value is preferably within the above appropriate range.

With a low-EW polymer electrolyte, the dimension of the polymer electrolyte membrane greatly changes, so that the durability tends to be poor in an environment at high temperature with a great humidity change, for example, in a fuel cell vehicle in operation. Since the polymer electrolyte membrane of the present invention comprises the above porous film, the dimension thereof is less likely to change and excellent durability and reliability can be achieved even with a low-EW polymer electrolyte.

The polymer electrolyte preferably has a proton conductivity of 0.10 S/cm or higher at 110° C. and a relative humidity of 80% RH. More preferably, the proton conductivity at 60% RH is 0.05 S/cm or higher, still more preferably the proton conductivity at 40% RH is 0.02 S/cm or higher, even more preferably the proton conductivity at 30% RH is 0.01 S/cm or higher.

The proton conductivity of the polymer electrolyte is preferably as high as possible. For example, the proton conductivity at 110° C. and a relative humidity of 50% RH may be 1.0 S/cm or lower.

The polymer electrolyte preferably satisfies a distance between ion clusters of 0.1 nm or longer and 2.6 nm or shorter at 25° C. and 50% RH. If the distance between ion clusters is 2.6 nm or shorter, the conductivity becomes drastically high.

The upper limit of the distance between ion clusters is more preferably 2.5 nm. The lower limit of the distance between ion clusters is more preferably 0.5 nm, still more preferably 1.0 nm, particularly preferably 2.0 nm.

A fluoropolymer electrolyte satisfying a distance between ion clusters within the above range has a unique ion cluster structure.

The ion cluster means an ion channel formed by an aggregate of multiple proton exchange groups, and perfluoro-type proton exchange membranes, typified by Nafion, are considered to have such an ion cluster structure (for example, see Gierke, T. D., Munn, G. E., Wilson, F. C., J. Polymer Sci., Polymer Phys, 1981, 19, p. 1687).

The distance d between ion clusters can be measured and calculated by the following method.

The produced fluoropolymer electrolyte is subjected to small-angle X-ray scattering measurement in an atmosphere of 25° C. and 50% RH. The resulting scattering intensities are plotted in relation to the Bragg angles θ, and the Bragg angle θm at the peak position derived from the cluster structure usually appearing at 2θ>1° is calculated. Based on the θm value, the distance d between ion clusters is calculated using the following formula (1):

$$d = \lambda/2/\sin(\theta m) \quad (1)$$

wherein λ represents an incident X-ray wavelength.

If the membrane is produced by casting, the membrane is annealed at 160° C. before the measurement. The fluoropolymer electrolyte is treated such that an end group that is a COOZ group or a SO$_3$Z group is converted into COOH or SO$_3$H. The sample membrane is kept in an atmosphere at 25° C. and 50% RH for 30 minutes or longer before the measurement.

In the fluoropolymer electrolyte, the distance between ion clusters is short. Thus, protons are considered to easily move among the ion clusters, showing a high conductivity even at low humidity.

The polymer electrolyte is preferably a fluoropolymer electrolyte, and the fluoropolymer electrolyte is preferably one having a monomer unit that has a COOZ group or a SO$_3$Z group (wherein Z represents an alkali metal, an alkaline earth metal, hydrogen, or NR$^1$R$^2$R$^3$R$^4$ where R$^1$, R$^2$, R$^3$, and R$^4$ each individually represent a C1-C3 alkyl group or hydrogen).

In the fluoropolymer electrolyte, the proportion of the COOZ or SO$_3$Z group-containing monomer unit is preferably 10 to 95 mol % in all the monomer units. The phrase "all the monomer units" herein means all the portions derived from monomers in the molecular structure of the fluoropolymer electrolyte.

The COOZ or SO$_3$Z group-containing monomer unit is typically derived from a COOZ or SO$_3$Z group-containing monomer represented by the following formula (I):

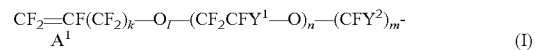

wherein Y$^1$ is F (a fluorine atom), Cl (a chlorine atom), or a perfluoroalkyl group; k is an integer of 0 to 2; l is 0 or 1; n is an integer of 0 to 8, n Y$^1$s may be the same as or different from each other; Y$^2$ is F or Cl; m is an integer of 0 to 12, if m=0, l=0 and n=0, m Y$^2$s may be the same as or different from each other; A$^1$ is COOZ or SO$_3$Z, where Z is an alkali metal, an alkaline earth metal, hydrogen, or NR$^1$R$^2$R$^3$R$^4$, where R$^1$, R$^2$, R$^3$, and R$^4$ are each individually a C1-C3 alkyl group or hydrogen.

In the formula (I), Y$^1$ is preferably F or —CF$_3$, more preferably F.

A$^1$ is preferably —SO$_3$Z, more preferably —SO$_3$H.

Preferably, m is an integer of 0 to 6.

For good synthesis and handleability, in the formula (I), k is more preferably 0; l is more preferably 1; and n is more preferably 0 or 1, still more preferably 0.

More preferably, Y$^2$ is F and m is an integer of 2 to 6, still more preferably Y$^2$ is F and m is 2 or 4, particularly preferably Y$^2$ is F and m is 2.

In the fluoropolymer electrolyte, one COOZ or SO$_3$Z group-containing monomer may be used or two or more thereof may be used in combination.

The fluoropolymer electrolyte is preferably a copolymer including a repeating unit (α) derived from the COOZ or SO$_3$Z group-containing monomer and a repeating unit (β) derived from an ethylenic fluoromonomer copolymerizable with the COOZ or SO$_3$Z group-containing monomer.

The ethylenic fluoromonomer to constitute the repeating unit (β) is a monomer that is free from ether oxygen (—O—) and has a vinyl group, and part or all of the hydrogen atoms in the vinyl group may optionally be replaced by fluorine atoms.

The term "ether oxygen" herein means a —O— structure constituting the monomer molecule.

Examples of the ethylenic fluoromonomer include haloethylenic fluoromonomers represented by the following formula (II):

(wherein Rf$^1$ represents F, Cl, or a C1-C9 linear or branched fluoroalkyl group), or hydrogen-containing fluoroethylenic fluoromonomers represented by the following formula (III):

(wherein Y$^3$ represents H or F, and Y$^4$ represents H, F, Cl, or a C1-C9 linear or branched fluoroalkyl group).

The ethylenic fluoromonomer may be tetrafluoroethylene (TFE), hexafluoropropylene (HFP), chlorotrifluoroethylene (CTFE), vinyl fluoride, vinylidene fluoride (VDF), trifluoroethylene, hexafluoroisobutylene, perfluorobutylethylene, or the like. It is preferably TFE, VDF, CTFE, trifluoroethylene, vinyl fluoride, or HFP, more preferably TFE, CTFE, or HFP, still more preferably TFE or HFP, particularly preferably TFE. One of the ethylenic fluoromonomers may be used or two or more thereof may be used in combination.

The fluoropolymer electrolyte is preferably a copolymer comprising 10 to 95 mol % of the repeating unit (α) derived from the COOZ or SO$_3$Z group-containing monomer, 5 to 90 mol % of the repeating unit (β) derived from the ethylenic fluoromonomer, with the sum of the proportions of the repeating unit (α) and the repeating unit (β) being 95 to 100 mol %.

The lower limit of the proportion of the repeating unit (α) derived from the COOZ or SO$_3$Z group-containing monomer is more preferably 15 mol %, still more preferably 20 mol %, whereas the upper limit thereof is more preferably 60 mol %, still more preferably 50 mol %.

The lower limit of the proportion of the repeating unit (β) derived from the ethylenic fluoromonomer is more preferably 35 mol %, still more preferably 45 mol %, whereas the upper limit thereof is more preferably 85 mol %, still more preferably 80 mol %.

The fluoropolymer electrolyte is preferably a copolymer containing a repeating unit derived from the COOZ or SO$_3$Z group-containing monomer represented by the formula (I) and a repeating unit derived from TFE.

The fluoropolymer electrolyte may contain, as a repeating unit derived from a third monomer other than the above components, a repeating unit (γ) derived from vinyl ether other than the COOZ or SO$_3$Z group-containing monomer, and the proportion thereof is preferably 0 to 5 mol %, more preferably 4 mol % or less, still more preferably 3 mol % or less.

The polymer composition of the fluoropolymer electrolyte can be calculated from the measured value in melt-state NMR at 300° C., for example.

The vinyl ether other than the COOZ or SO$_3$Z group-containing monomer to constitute the repeating unit (γ) may be any one containing neither the COOZ group nor the SO$_3$Z group, and examples thereof include fluorovinyl ethers represented by the following formula (IV):

$$CF_2=CF-O-Rf^2 \qquad (IV)$$

(wherein Rf$^2$ represents a C1-C9 fluoroalkyl group or a C1-C9 fluoropolyether group), more preferably perfluorovinyl ether, or hydrogen-containing vinyl ethers represented by the following formula (V):

$$CHY^5=CF-O-Rf^3 \qquad (V)$$

(wherein Y$^5$ represents H or F, and Rf$^3$ represents a C1-C9 linear or branched fluoroalkyl group that may optionally have an ether group). One of the vinyl ethers may be used or two or more thereof may be used.

The polymer electrolyte can be produced by any conventionally known method. For example, the polymer electrolyte can be produced by the method disclosed in WO 2009/116446 A1.

The polymer electrolyte membrane of the present invention preferably has a thickness of 1 μm or larger and 500 μm or smaller, more preferably 2 μm or larger and 100 μm or smaller, still more preferably 5 μm or larger and 50 μm or smaller.

The polymer electrolyte membrane of the present invention can be made thin while maintaining the excellent durability thereof by the use of the above porous film.

Next, a production method for the polymer electrolyte membrane of the present invention will be described below.
(Production Method for Polymer Electrolyte Membrane)

The polymer electrolyte membrane of the present invention can be produced by immersing the porous film into a polymer electrolyte solution to be mentioned later or applying the polymer electrolyte solution to the porous film. The immersion or the application is preferably followed by drying.

Examples of the immersion method include dip coating. Examples of the application method include a slot die technique, and coating techniques disclosed in JP H11-501964 T, such as forward roll coating, reverse roll coating, gravure coating, knife coating, kiss coating, and spray coating. The coating technique can be appropriately selected from these techniques in accordance with the thickness of a layer of the coating liquid to be formed, the material properties of the coating liquid, coating conditions, and the like.

The drying removes a solvent constituting the polymer electrolyte solution. The drying may be performed at room temperature or under heating.

The drying is preferably performed under heating, preferably under heating at 50° C. to 350° C., for example.

One example of a more specific method for producing the polymer electrolyte membrane of the present invention is a method including: forming a film of a polymer electrolyte solution on a long and narrow casting substrate (sheet) in a state of moving or being left to stand; bringing a long and narrow porous film into contact with the solution to form an unfinished composite structure; drying the unfinished composite structure in, for example, a hot-air circulating chamber; and forming another film of the polymer electrolyte solution on the dried unfinished composite structure to provide a polymer electrolyte membrane.

In order to improve the conductivity and the mechanical strength of the polymer electrolyte membrane, one or more layers containing a polymer electrolyte may be formed on at least one main surface of the thus-produced polymer electrolyte membrane.

Further, the compounds contained therein may be cross-linked with each other by means of a cross-linker, ultraviolet rays, electron beams, radial rays, or the like.
(Polymer Electrolyte Solution)

The polymer electrolyte solution can be produced by dissolving or suspending the polymer electrolyte in an appropriate solvent (a solvent having good affinity with resin).

Examples of an appropriate solvent include water, protonic organic solvents such as ethanol, methanol, n-propanol, isopropyl alcohol, butanol, and glycerol, and aprotic solvents such as N,N-dimethylformamide, N,N-dimethylacetamide, and N-methylpyrrolidone. One of these may be used alone or two or more of these may be used in combination. If one solvent is used alone, water is preferred. If two or more solvents are used in combination, a solvent mixture of water and a protonic organic solvent is particularly preferred.

The dissolution or suspension can be achieved by any method. For example, the polymer electrolyte is first added to a solvent mixture of water and a protonic organic solvent such that the total solid content is 1 to 50 mass %. Next, this composition is put into an autoclave with a glass inner cylinder, if necessary, and the atmosphere inside the cylinder is purged with inert gas such as nitrogen. Then, the system is heated under stirring for 1 to 12 hours at an internal temperature of 50° C. to 250° C. Thereby, a solution or a suspension is obtained. The total solid content is preferably as high as possible for higher yield. Still, too high a total solid content may cause undissolved matter. Thus, the total solid content is preferably 1 to 50 mass %, more preferably 3 to 40 mass %, still preferably 5 to 30 mass %.

If a protonic organic solvent is used, the ratio between water and the protonic organic solvent can be appropriately selected in accordance with the dissolving method, the dissolving conditions, the type of a polymer electrolyte, the total solid content, the dissolving temperature, the stirring speed, and the like. The mass ratio of the protonic organic solvent to water is preferably 0.1 to 10 of protonic organic solvent to 1 of water, particularly preferably 0.1 to 5 of the organic solvent to 1 of water.

Such a solution or suspension includes one or two or more of emulsion (in which liquid particles are dispersed as colloidal particles or more coarse particles in liquid to be in the state of emulsion), suspension (in which solid particles are dispersed as colloidal particles or particles having a size to be observed through a microscope in liquid), colloidal liquid (in which macromolecules are dispersed), micellar liquid (which is a lyophilic colloids dispersion formed by association of many small molecules by intermolecular force), and the like.

Also, such a solution or suspension can be concentrated. The concentration may be achieved by any method. Examples thereof include a method for heating the solution or suspension to evaporate the solvent and a method for concentrating the solution or suspension under reduced pressure. If the resulting coating solution has too high a solid concentration, it may have a high viscosity and be difficult to handle. If the resulting coating solution has too low a solid concentration, the productivity thereof may be poor. Thus, the final solid concentration of the coating solution is preferably 0.5 to 50 mass %.

In order to remove coarse particles, the resulting solution or suspension is more preferably filtered. The filtration may be performed by any method, such as conventionally performed usual methods. One typical example of the method is pressure filtration using a filter obtained by processing a filter material having a filtration rating usually used. The filter is preferably a filter material whose 90% capture particle size is 10 to 100 times the average particle size of the particles. This filter material may be filter paper or may be a filter material such as a metal-sintered filter. In the case of filter paper, the 90% capture particle size thereof is preferably 10 to 50 times the average particle size of the particles. In the case of a metal-sintered filter, the 90% capture particle size thereof is preferably 50 to 100 times the average particle size of the particles. Adjusting the 90% capture particle size to 10 or more times the average particle size possibly enables suppression of an excessive increase in a pressure for liquid delivery and suppression of filter clogging in a short time. In contrast, adjusting the 90% capture particle size to 100 or less times the average particle size is preferred in order to favorably remove aggregates of the particles or undissolved resin that may cause foreign matters in the resulting film.

The membrane electrode assembly of the present invention comprises the polymer electrolyte membrane. A unit comprising an electrolyte membrane and two electrode catalyst layers that are an anode and a cathode and joined to the respective surfaces of the membrane is called a membrane electrode assembly (hereinafter, also abbreviated as "MEA"). The MEA may also include those prepared by oppositely joining a pair of gas diffusion layers to the outer surfaces of the electrode catalyst layers.

The electrode catalyst layers each comprise fine particles of a catalyst metal and a conducting agent carrying the catalyst metal, and a water repellant, if necessary. The catalyst used for the electrodes may be any metal that promotes oxidation of hydrogen and reduction of oxygen, and examples thereof include platinum, gold, silver, palladium, iridium, rhodium, ruthenium, iron, cobalt, nickel, chromium, tungsten, manganese, vanadium, and any alloy thereof. In particular, platinum is mainly used.

The amount of the electrode catalyst supported relative to the electrode area is, in the form of an electrode catalyst layer, preferably 0.001 to 10 mg/cm$^2$, more preferably 0.01 to 5 mg/cm$^2$, most preferably 0.1 to 1 mg/cm$^2$.

The resulting MEA, in some cases the MEA with a pair of gas diffusion electrodes disposed on the opposite sides, is combined with constitutional elements used in usual polymer electrolyte fuel cells, such as a bipolar plate and a backing plate, and thereby a polymer electrolyte fuel cell is produced. The present invention also relates to a polymer electrolyte fuel cell comprising the membrane electrode assembly.

The bipolar plate means a plate of a composite material of graphite and resin or a plate of metal having on a surface thereof a channel for flowing fuel or gas such as an oxidizing agent. The bipolar plate has not only a function of delivering electrons to an external load circuit but also a function as a channel for supplying fuel or an oxidizing agent to the vicinity of the electrode catalyst. Intercalation of an MEA between such bipolar plates and the resulting stack of multiple layers lead to a fuel cell.

EXAMPLES

In examples, the respective physical properties are determined by the following methods.

(1) Polymer Solid Concentration

Polytetrafluoroethylene aqueous dispersion (1 g) is dried at 150° C. for 30 minutes in a blowing dryer. The percentage of the mass of the nonvolatile matter to the mass (1 g) of the aqueous dispersion is defined as a polymer solid concentration.

(2) Average Primary Particle Size

A polytetrafluoroethylene aqueous dispersion is diluted with water to have a solid concentration of 0.15 mass %. Then, the transmittance of incident light at 550 nm relative to the unit length of the resulting diluted latex is determined and the number-based length average particle size is determined by measuring the Feret diameter in a transmission electron micrograph. Based on these values, a calibration curve is drawn. Using this calibration curve, the average primary particle size is determined from the measured transmittance of incident light at 550 nm of each sample.

(3) Amount of Trace Comonomer

PTFE fine powder was molten at high temperature and was subjected to F$^{19}$-NMR measurement. The amount of the trace comonomer was calculated from the signals assigned to functional groups in the resulting trace comonomer.

For example, the amount of PMVE used in the examples of the present application was calculated by F$^{19}$-NMR measurement at 360° C. using the following formula:

$$\text{Amount of trace comonomer (mol \%)} = (4B/3)/(A+(B/3)) \times 100$$

wherein A=sum of CF$_2$ signal and CF signal around −118 ppm; and B=integral value of CF$_3$ signal assigned to PMVE around −52 ppm.

(4) Standard Specific Gravity (SSG) of PTFE

A sample is produced in conformity with ASTM D4895-89, and the specific gravity of the resulting sample is measured by the water replacement method.

(5) Extrusion Pressure at RR100

First, 100 g of PTFE fine powder is blended with a lubricant (trade name: IP1620 (registered trademark), product of Idemitsu Petrochemical Co., Ltd.) in an amount of 18.0 mass % based on the sum of the amounts of the PTFE fine powder and the lubricant, and the components are mixed in a glass bottle for three minutes at room temperature. Next, the glass bottle is left to stand for at least one hour at room temperature (25° C.) before extrusion, and thereby a lubricated resin is obtained. The lubricated resin is paste-extruded through an orifice (diameter: 2.5 mm, land length: 5 mm, introduction angle: 30°) at room temperature and a reduction ratio of 100:1, and thereby uniform beading (extrudate) is obtained. The extrusion rate, i.e., ram speed, is 20 in/min (51 cm/min). The extrusion pressure is a value determined by measuring a load when the extrusion load reaches equilibrium during the paste extrusion, and then dividing the measured load by the cross-sectional area of a cylinder used in the paste extrusion.

(6) Breaking Strength

The extrusion beading was subjected to a stretching test, and thereby a sample for breaking strength measurement was produced.

The beading obtained by the paste extrusion was dried at 230° C. for 30 minutes so that the lubricant was removed. The dried beading was cut into an appropriate length and the cut beading was held at its ends by clamps with a gap between the clamps of 5.1 cm. The beading was then heated up to 300° C. in an air-circulation furnace, and the clamps were moved apart from each other at a stretching rate of 100%/sec until the distance between the clamps corresponded to a total stretch of 2,400%. Thereby, the stretching test was performed. The "total stretch" refers to the rate of increase in the length of the beading by the stretching based on the length of the beading (100%) before the stretch test.

The stretched beading prepared under the aforementioned stretching conditions was cut into an appropriate length, and the cut beading was fixed by movable jaws with a gauge length of 5.0 cm. The movable jaws were driven at a speed of 300 mm/min, and the breaking strength was measured using a tensile tester at room temperature. The minimum tensile load (force) at break among the tensile loads at break of three samples obtained from the stretched beading, i.e., two samples from the respective ends of the stretched beading (excluding the neck down within the range of the clamps, if exist), and one sample from the center thereof, was defined as the breaking strength.

(7) Stress-Relaxation Time

A sample for stress-relaxation time measurement was produced by stretching the dried beading in the same manner as in the above stretching test except that the gap between clamps was changed to 3.8 cm and the stretching rate was changed to 1,000%/sec. The total stretch is 2,400%.

This sample was fixed at both ends by fixing parts and tightly pulled so that the whole length was 25 cm. The stress-relaxation time was a time from when this sample was put into an oven set to 390° C. to when the sample was broken.

(8) Grammage

The mass (g) of a rectangular sample with a size of 4.0 cm×12.0 cm is measured using a precision scale, and the mass is divided by the area (0.0048 m$^2$). The quotient is defined as the grammage.

(9) Film Density

The mass of a rectangular sample with a size of 4.0 cm×12.0 cm is measured using a precision scale. Using the measured mass and the thickness, the film density is calculated by the following formula:

$$\rho = M/(4.0 \times 12.0 \times t)$$

wherein
$\rho$=film density (g/cm$^3$)
M=mass (g)
t=thickness (cm).

The measurement and the calculation are performed at three points, and the average value thereof is defined as the film density.

(10) Porosity

The porosity is determined by the following formula using the film density and the PTFE true density (2.2 g/cm$^3$):

$$\text{Porosity} = 1 - (\text{film density}/\text{PTFE true density})$$

wherein the PTFE true density is 2.2 g/cm$^3$.

(11) Thickness

Five biaxially stretched porous films are stacked and the total thickness is measured using a thickness meter, and the measured value is divided by 5. The quotient is defined as the thickness of one biaxially stretched porous film.

(12) Product of Matrix Tensile Strengths (Vertical and Lateral)

Based on the vertical matrix tensile strength and the lateral matrix tensile strength determined by the following methods, the "product of the vertical and lateral matrix tensile strengths" is determined.

(Vertical Matrix Tensile Strength)

First, five samples are cut out of a biaxially stretched porous film. Each sample has a dimension of 15.0 cm in the machine direction (longitudinal direction, i.e., paste extruding direction) and 2.0 cm in the transverse direction (width direction, i.e., direction perpendicular to the paste extruding direction). For the five samples, the tensile strength in the machine direction is measured, and the maximum loads of the respective five samples are determined.

Next, the largest one and the smallest one of the maximum loads of the five samples are eliminated and an average value of the remaining three values is calculated. This average value is defined as the vertical average maximum load.

The vertical matrix tensile strength is determined by the following formula using the vertical average maximum load, the sample width (2.0 cm), the thickness, and the porosity.

$$\text{Vertical matrix tensile strength} = \{(\text{vertical average maximum load})/(2.0 \times \text{thickness})\}/(1-\text{porosity}).$$

(Lateral Matrix Tensile Strength)

First, five samples are cut out of a biaxially stretched porous film. Each sample has a dimension of 2.0 cm in the machine direction (longitudinal direction, i.e., paste extruding direction) and 15.0 cm in the transverse direction (width direction, i.e., direction perpendicular to the paste extruding direction). For the five samples, the tensile strength in the transverse direction is measured, and the maximum loads of the respective five samples are determined.

Next, the lateral average maximum load is calculated in the same manner as in the case of the machine direction, and the lateral matrix tensile strength is determined using the following formula:

$$\text{Lateral matrix tensile strength} = \{(\text{lateral average maximum load})/(2.0 \times \text{thickness})\}/(1-\text{porosity}).$$

In the tensile strength measurement, a tensile tester equipped with a 50 N load cell is used at a chuck length of 5.0 cm and a cross-head speed of 300 mm/min.

(13) Average Pore Size

The mean flow pore size (MFP) measured in conformity with ASTM F316-86 was defined as the average pore size.

(14) Fibril/Node Area Ratio

The fibril/node area ratio is determined by the following method.

First, an image (SEM image, magnification: 1,000× to 5,000×) of a surface of the porous film is taken using a scanning electron microscope (SU8020, product of Hitachi Ltd., vapor deposition is performed with E1030, product of Hitachi Ltd.). This image is imported into a processing apparatus (body: TV image processor TVIP-4100II, product of Nippon Avionics Co., Ltd.; control software: TV image processor image command 4198, product of Ratoc System Engineering Co., Ltd.). The data is divided into nodes and fibrils, and an image consisting of the nodes and image consisting of the fibrils are obtained. The fibril/node area ratio is determined from the ratio between the sum of the areas of the fibrils and the sum of the areas of the nodes.

(15) Contact Angle of Electrolyte Solution

The contact angle value was a contact angle measured using a static contact angle meter FM40 Easy Drop (product of KRUSS GmbH) 60 seconds after dropping onto the porous film 5.0 µL of the polymer electrolyte solution (prepared by adding 1-propanol and deionized water to a 20.86 mass % perfluorosulfonic acid polymer aqueous solution (trade name: SS700C/20, product of Asahi Kasei E-materials Corp., EW=740)) consisting of 10 wt % of perfluorocarbon sulfonic acid resin having an equivalent weight (EW) of 700, 45 wt % of deionized water, and 45 wt % of 1-propanol.

(16) Vertical Strength and (17) Lateral Strength

The film sample was cut into a rectangular film having a size of 70 mm in the longitudinal (vertical) direction×10 mm in the width (lateral) direction, and the tensile strength thereof was measured in conformity with JIS K7127.

(18) Vertical Dimensional Change and (19) Lateral Dimensional Change

The film sample was cut into a rectangular film having a size of 4 cm×3 cm, and the cut film was left to stand in a constant-temperature constant-humidity chamber (23° C., 50% RH) for one hour or longer. The dimensions in the plane directions of the dried rectangular film sample were measured.

Next, the measured rectangular film sample was boiled in 80° C. hot water for one hour and the sample was made to sufficiently absorb water such that the electrolyte membrane was wet enough to have a mass change due to water of 5% or lower (such that the volume swelling due to water absorption was saturated). At this time, the membrane was taken out of the hot water and the moisture on the surface was sufficiently removed, and then the mass change was confirmed to be 5% or lower using an electronic scale. This wet membrane sample swelling by absorbing water was taken out of the hot water, and the dimensions in the plane directions (i.e., the longitudinal (vertical) direction and the width (lateral) direction) were measured. Based on the dry dimensions in the plane directions, an average of the increments of the respective wet dimensions in the plane directions from the dry dimensions was calculated. This average was taken as the dimensional change (%).

(20) Membrane Resistance

In order to determine the membrane resistance of an electrolyte membrane that is a composite of the microporous film under high-temperature and low-humidity conditions, a battery performance test was performed as follows.

(20)-1 Preparation of Electrode Catalyst Ink

A 20 mass % perfluorosulfonic acid polymer solution (SS700C/20, product of Asahi Kasei Corp., equivalent mass (EW): 740) and an electrode catalyst (TEC10E40E, product of Tanaka Kikinzoku Hanbai K.K., platinum amount: 36.7 wt %) were blended at a platinum/perfluorosulfonic acid polymer ratio of 1/1.15 (mass). Then, ethanol was added thereto so that the solids content (sum of the amounts of the electrode catalyst and the perfluorosulfonic acid polymer) was 11 wt %. The mixture was stirred using a homogenizer (product of As One Corp.) at 3,000 rpm for 10 minutes. Thereby, an electrode catalyst ink was obtained.

(20)-2 Production of MEA

The electrode catalyst ink was applied to both surfaces of a polymer electrolyte membrane using an automatic screen printer (trade name: LS-150, product of Newlong Seimitsu Kogyo Co., Ltd.) such that the platinum amount on the anode side was 0.2 mg/cm$^2$ and the platinum amount on the cathode side was 0.3 mg/cm$^2$, and then the ink was dried and solidified at 140° C. for five minutes. Thereby, a MEA was obtained.

(20)-3 Production of Single Fuel Cell

Gas diffusion layers (trade name: GDL35BC, product of MFC Technology) were stacked on the respective electrodes of the MEA, and then gaskets, bipolar plates, and backing plates were stacked thereon. Thereby, a single fuel cell was obtained.

(20)-4 Measurement of Membrane Resistance

The single fuel cell was mounted on an evaluation device (fuel cell evaluation system 890CL, product of Toyo Corp.), and the membrane resistance was measured.

The battery performance test was performed at a cell temperature of 90° C. and a humidifying bottle temperature of 60° C. (30% RH), with hydrogen gas supplied to the anode and air gas supplied to the cathode at a gas utilization rate of, respectively, 70% and 40%. Both the anode and the cathode were not pressurized (under atmospheric pressure). A current of 0 A to 20 A was applied, and the resistance value at that time was measured.

(Power Generation Characteristics of Fuel Cell)

The evaluation of the membrane electrode assembly was performed using a polymer electrolyte fuel cell (single cell).

A single cell was mounted on a fuel cell evaluation device (automatic fuel cell evaluation system, product of TOYO Corp.), and a power generation test was performed using hydrogen gas as a fuel and air gas as an oxidizing agent under the following high-temperature high-humidity condition and high-temperature and low-humidity condition. Using a cell voltage at a current density of 0.25 A/cm$^2$, the power generation characteristics were evaluated.

—High Humidity Condition

Normal pressure, cell temperature: 80° C., hydrogen gas humidifying temperature: 80° C., air gas humidifying temperature: 80° C., hydrogen gas utilization rate: 75%, air gas utilization rate: 55%.

—Low Humidity Condition

Normal pressure, cell temperature: 80° C., hydrogen gas humidifying temperature: 60° C., air gas not humidified, hydrogen gas utilization rate: 75%, air gas utilization rate: 55%.

Production Example 1

A homo-PTFE fine powder (PTFE-A) was obtained in conformity with Comparative Example 3 of WO 2005/061567 A1 except that the drying temperature was changed to 160° C.

For the resulting PTFE-A, the parameters were measured and evaluated. Table 1 shows the results.

Production Example 2

A homo-PTFE fine powder (PTFE-B) was obtained in conformity with Comparative Example 3 of WO 2005/061567 A1 except that the drying temperature was changed to 135° C.

For the resulting PTFE-B, the parameters were measured and evaluated. Table 1 shows the results.

Production Example 3

A 6-L stainless steel (SUS316) autoclave provided with a stainless steel (SUS316) anchor stirrer and a temperature control jacket was charged with 3,560 ml of deionized water, 104 g of paraffin wax, and 5.4 g of $CF_3OCF(CF_3)CF_2OCF(CF_3)COONH_4$ serving as a fluorosurfactant. The system was purged with nitrogen gas three times and with TEE gas twice under heating up to 70° C., so that oxygen was removed. Then, the pressure inside the container was adjusted to 0.60 MPa by TFE gas, the contents were stirred at 250 rpm, and the temperature inside the container was maintained at 70° C.

Next, 0.60 g (if the whole amount was reacted, this amount corresponds to 0.029 mol % (0.049 mass %) based on the whole amount of TEE to be polymerized) of perfluoromethyl vinyl ether (PMVE) was injected with TEE so that the pressure inside the container of the autoclave was adjusted to 0.70 MPa.

An aqueous solution of ammonium persulfate (15.4 mg) in deionized water (20 ml) was injected with TEE so that the pressure inside the container of the autoclave was adjusted to 0.78 MPa, and the polymerization reaction was started.

The pressure inside the container decreased as the polymerization reaction proceeded. Thus, TEE was continually added so as to always maintain the pressure inside the container of the autoclave at 0.78±0.05 MPa. The temperature inside the container was maintained at 70° C. and the stirring speed was maintained at 250 rpm.

When 429 g (35.0 mass % relative to the whole amount (1,225 g) of TEE to be polymerized) of TEE was consumed, an aqueous solution of hydroquinone (14.32 mg (4.0 ppm relative to the aqueous medium)) serving as a radical scavenger in deionized water (20 ml) was injected with TFE.

The polymerization was further continued. When 1225 g of TFE was consumed, the stirring and the addition of the monomer were stopped. The gas inside the autoclave was immediately released to normal pressure and the reaction was finished. Thereby, a modified PTFE aqueous dispersion A was obtained.

A trace of the polymer coagulum was observed in the polymerization container.

For the resulting aqueous dispersion, the polymer solid concentration and the average primary particle size were determined. Table 1 shows the measurement results.

Next, a 6-L stainless steel (SUS316) coagulation tank provided with a stainless steel (SUS316) stirrer, a baffle, and a temperature control jacket was charged with 3 L of the PTFE aqueous dispersion A prepared by filtering off paraffin and being diluted with deionized water so as to have a polymer solid concentration of 14 wt %.

The temperature was controlled so that the temperature of the contents was 16° C., and the stirring was started (at 450 rpm).

At this time, 3 g of a 10 wt % aqueous solution of ammonium hydrogen carbonate used as a neutralizer was put into the coagulation tank. When the polymer powder was separated from water, the stirring was stopped. The resulting wet powder was filtered, and the residue was washed with 3 L of deionized water.

This washing process was repeated twice, and the residue was then dried for 18 hours in a hot-air circulating dryer set to 160° C. Thereby, a modified PTFE fine powder C (PTFE-C) was obtained.

The amount of PMVE, SSG, extrusion pressure at RR100, breaking strength, and stress-relaxation time were measured and evaluated. Table 1 shows the results.

Production Example 4

A homo-PTFE fine powder (PTFE-D) was obtained in accordance with Example 2 of WO 2010/113950 A1.

For the resulting PTFE-D, the respective parameters were measured and evaluated. Table 1 shows the results,

TABLE 1

| Parameter | Unit | Production Example 1 | Production Example 2 | Production Example 3 | Production Example 4 |
|---|---|---|---|---|---|
| Polymer solid concentration | Mass % | 25.6 | 25.5 | 25.4 | 30.9 |
| Average primary particle size | nm | 320 | 315 | 250 | 339 |
| Trace comonomer | — | — | — | PMVE | — |
| Amount of trace comonomer | Mol % | — | — | 0.028 | — |
| Standard specific gravity (SSG) | — | 2.158 | 2.159 | 2.145 | 2.152 |
| Extrusion pressure | MPa | 15.8 | 13.9 | 16.3 | 19.1 |
| Breaking strength | N | 28.2 | 24.6 | 29.4 | 35.2 |
| Stress-relaxation time | Sec | 540 | 420 | 390 | 680 |

Example 1

Extrusion and Rolling

Hydrocarbon oil ("IP Solvent 2028", product of Idemitsu Kosan Co., Ltd.), serving as an extrusion aid, was added in an amount of 26 parts by weight for each 100 parts by weight of the PTFE fine powder A (PTFE-A) obtained in Production Example 1 at 20° C. The components were mixed and the mixture was left to stand for 12 hours in a 40° C. electric furnace, so that the extrusion aid was allowed to sufficiently permeate into the powder.

Next, the resulting mixture was extruded through a paste extruder into a sheet-shaped molded article. The tip of the paste extruder was equipped with a sheet die having a rectangular orifice with a dimension of 2 mm in the width direction×150 mm in the longitudinal direction. The resulting sheet-like molded article was molded into a film shape using a calender roll heated up to 70° C., and thereby a PTFE film was obtained.

This film was passed through a hot-air drying furnace so that the hydrocarbon oil was evaporated, and thereby a belt-like non-sintered PTFE film having an average thickness of 300 μm and an average width of 150 mm was obtained.

(Semi-Sintering)

The resulting non-sintered PTFE film was immersed in a salt bath controlled to 338° C. for 70 seconds to be heat-treated. Thereby, a semi-sintered PTFE film was obtained.

(Uniaxial Stretching)

The resulting non-sintered PTFE film was stretched in the longitudinal direction at a stretch ratio of 12 times and a stretching rate of 40%/sec using a stretching device equipped with multiple rolls illustrated in FIG. 10. The stretching temperature was 300° C.

(Biaxial Stretching)

The uniaxially stretched non-sintered film was stretched in the width direction at a stretch ratio of 43 times and a line speed of 10 m/min using a tenter capable of continuous clipping illustrated in FIG. 11, and the film was heat-set. At this time, the stretching temperature was 380° C. and the heat-setting temperature was 390° C.

The physical properties (grammage, film density, thickness, matrix tensile strengths, average pore size) of the resulting porous film were evaluated. Table 2 shows the results.

(Production of Polymer Electrolyte Solution)

First, a precursor polymer of the polymer electrolyte, that is, precursor pellets (ion exchange volume after hydrolysis and acid treatment: 1.4 mEq/g) of perfluorosulfonic acid resin formed from tetrafluoroethylene and $CF_2=CFO(CF_2)_2—SO_2F$ were prepared. Next, the precursor pellets were brought into contact with an aqueous solution containing potassium hydroxide (15 mass %) and methyl alcohol (50 mass %) dissolved therein at 80° C. for 20 hours, so that the pellets were hydrolyzed. Then, the pellets were immersed in 60° C. water for five hours. Next, the pellets after immersed in water were immersed in 60° C. 2 N hydrochloric acid for one hour. This treatment was repeated five times, with the hydrochloric acid replaced by a new one in every treatment. Thereafter, the pellets repeatedly immersed in hydrochloric acid were washed with deionized water and dried. Thereby, a perfluorocarbon sulfonic acid resin (PFSA), which is the polymer electrolyte, was obtained.

These pellets were put into a 5-L autoclave together with an ethanol aqueous solution (water:ethanol=50.0/50.0 (mass ratio)) and the autoclave was sealed. The temperature was increased up to 160° C. while the contents were stirred with a stirrer, and the system was maintained for five hours. Then, the autoclave was naturally cooled, and thereby a uniform perfluorocarbon sulfonic acid resin solution with a solids content of 5 mass % was obtained. This solution was vacuum-concentrated at 80° C. and diluted with water and ethanol. Thereby, a solution of ethanol:water=60:40 (mass ratio) having a viscosity of 500 cP and a solids content of 15.0 mass % was prepared. This solution was treated as Solution 1.

(Production of Polymer Electrolyte Membrane)

The Solution 1 was applied to a base film using a bar coater (bar No. 200, product of Matsuo Sangyo Co., Ltd., wet thickness: 200 μm) (applied area: about 200 mm width× about 500 mm length). Before the Solution 1 was completely dried, the PTFE porous film (obtained in Example 1; thickness: 3.0 μm, film density: 0.700 g/cm³, sample size: 200 mm width×500 mm length) was stacked on the Solution 1, and the Solution 1 and the microporous film were press-bonded using a rubber roll on the microporous film. At this time, partial filling of the solution into the microporous film was visually confirmed. This film was dried in a 90° C. oven for 20 minutes. Next, the Solution 1 was again stacked on the PTFE microporous film of the resulting film, so that the pores of the microporous film were sufficiently filled with the Solution 1. This film was further dried in a 90° C. oven for 20 minutes. The "PTFE microporous film sufficiently impregnated with the Solution 1" thus obtained was heat-treated in a 170° C. oven for one hour. Thereby, a polymer electrolyte membrane with a thickness of about 25 μm was obtained. Table 2 shows the results of evaluating the polymer electrolyte membrane.

Example 2

A porous film was obtained by the same processing as in Example 1 except that the PTFE fine powder B (PTFE-B) obtained in Production Example 2 was used as a material. Also, a polymer electrolyte membrane was obtained in the same manner as in Example 1.

The physical properties were measured in the same manner as in Example 1. Table 2 shows the results.

Example 3

A porous film was obtained by the same processing as in Example 2 except that the modified PTFE fine powder C (PTFE-C) obtained in Production Example 3 was used as a material, the uniaxial stretch ratio was 10 times, and the semi-sintering temperature was 330° C. Also, a polymer electrolyte membrane was obtained in the same manner as in Example 1.

The physical properties were measured in the same manner as in Example 1. Table 2 shows the results.

Example 4

1. Preparation of Electrode Catalyst Ink 1

First, 0.63 g of a 22.60 mass % perfluorosulfonic acid polymer aqueous solution (trade name: SS400C/20, product of Asahi Kasei E-materials Corp., EW=450), 1.36 g of a 20.86 mass % perfluorosulfonic acid polymer aqueous solution (trade name: SS700C/20, product of Asahi Kasei E-materials Corp., EW=740), and 9.97 g of ethanol were blended with 1.00 g of Pt on carbon (TEC10E40E, product of Tanaka Kikinzoku Kogyo K.K., Pt content: 37.0 mass %) serving as electrode catalyst particles (composite particles). The components were stirred using a homogenizer, and thereby a uniform electrode catalyst ink was obtained. The perfluorosulfonic acid polymer mixture contained in this electrode catalyst ink had an EW of 609. This electrode catalyst ink was treated as an electrode catalyst ink 1.

2. Preparation of Electrode Catalyst Ink 2

First, 2.04 g of a 20.86 mass % perfluorosulfonic acid polymer aqueous solution (trade name: SS700C/20, product of Asahi Kasei E-materials Corp., EW=740) and 9.92 g of ethanol were blended with 1.00 g of Pt on carbon (TEC10E40E, product of Tanaka Kikinzoku Kogyo K.K., Pt content: 37.0 mass %) serving as electrode catalyst particles (composite particles). The components were stirred using a homogenizer, and thereby a uniform electrode catalyst ink was obtained. This electrode catalyst ink was treated as an electrode catalyst ink 2.

The electrode catalyst ink 1 was applied to the polymer electrolyte disclosed in Example 1 such that the amount of platinum was 0.3 mg/cm². The application of the electrode catalyst ink was performed using a screen printer (LS-150, product of Newlong Seimitsu Kogyo Co., Ltd.) equipped with a 200-mesh screen (product of Nihon Mesh Kogyo Co., Ltd.). Next, the electrode catalyst ink 2 was applied to the opposite side of the electrolyte membrane by the same process such that the amount of platinum was 0.2 mg/cm², Then, the inks were dried at 140° C. for five minutes in the atmosphere, and thereby a membrane electrode assembly was obtained. The side of the membrane electrode assembly covered with the electrode catalyst ink 1 was mounted on the cathode and the side of the membrane electrode assembly covered with the electrode catalyst ink 2 was mounted on the anode, and a single cell was assembled with carbon paper (GDL35BC, product of SGL Group) that has a microporous layer being used as a gas diffusion layer. The power generation characteristics of the fuel cell were determined by the aforementioned determination method. The cell voltage under the high-humidity condition was 0.744 V and the cell voltage under the low-humidity condition was 0.730 V.

Comparative Example 1

A porous film was obtained by the same processing as in Example 1 except that semi-sintering was not performed. Also, a polymer electrolyte membrane was obtained in the same manner as in Example 1.

The physical properties were measured in the same manner as in Example 1. Table 2 shows the results.

Comparative Example 2

A porous film was obtained by the same processing as in Comparative Example 1 except that the uniaxial stretch ratio was 20 times. Also, a polymer electrolyte membrane was obtained in the same manner as in Comparative Example 1.

The physical properties were measured in the same manner as in Comparative Example 1. Table 2 shows the results.

Comparative Example 3 le;.5qA porous film was obtained by the same processing as in Comparative Example 1 except that the PTFE fine powder D (PTFE-D) obtained in Production Example 4 was used. Also, a polymer electrolyte membrane was obtained in the same manner as in Comparative Example 1.

The physical properties were measured in the same manner as in Comparative Example 1. Table 2 shows the results.

Comparative Example 4

A porous film was obtained by the same processing as in Example 1 except that the semi-sintering conditions and the biaxial stretching conditions were changed. Also, a polymer electrolyte membrane was obtained in the same manner as in Example 1.

The physical properties were measured in the same manner as in Example 1. Table 2 shows the results.

Comparative Example 5

A porous film was obtained by the same processing as in Example 1 except that the semi-sintering conditions and the biaxial stretching conditions were changed. Also, a polymer electrolyte membrane was obtained in the same manner as in Example 1.

The physical properties were measured in the same manner as in Example 1. Table 2 shows the results.

TABLE 2

| | Parameter | Unit | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|---|
| Extrusion | PTFE material | — | PTFE-A | PTFE-B | PTFE-C | PTFE-A | PTFE-A | PTFE-D | PTFE-A | PTFE-A |
| | Extrusion aid | Parts by weight | 26 | 26 | 25 | 26 | 26 | 26 | 28 | 28 |
| | Extrusion pressure | MPa | 11.5 | 10.3 | 14.9 | 11.5 | 11.5 | 18.2 | 10.2 | 10.2 |
| Rolling | Average thickness | μm | 300 | 300 | 300 | 300 | 300 | 300 | 300 | 300 |
| Semi-sintering | Heat-treating temperature | ° C. | 338 | 338 | 330 | — | — | — | 338 | 338 |
| | Treating time | Sec | 70 | 70 | 70 | — | — | — | 95 | 120 |
| | Firing degree | | 0.31 | 0.29 | 0.18 | — | — | — | 0.36 | 0.42 |
| Uniaxial stretching | Stretch ratio | Times | 12 | 12 | 10 | 12 | 20 | 12 | 12 | 10 |
| | Stretching rate | %/sec | 40 | 40 | 40 | 40 | 40 | 40 | 40 | 40 |
| | Stretching temperature | ° C. | 300 | 300 | 300 | 300 | 300 | 250 | 300 | 300 |
| Biaxial stretching | Stretch ratio | Times | 43 | 43 | 43 | 43 | 43 | 43 | 43 | 43 |
| | Line speed | m/min | 10 | 10 | 10 | 10 | 10 | 10 | 15 | 15 |
| | Stretching temperature | ° C. | 380 | 380 | 380 | 295 | 295 | 295 | 380 | 380 |
| | Heat-setting temperature | ° C. | 390 | 390 | 390 | 340 | 340 | 340 | 390 | 390 |
| Physical properties of porous film | Grammage | g/m² | 2.10 | 2.32 | 2.33 | 2.71 | 0.80 | 2.33 | 2.54 | 3.04 |
| | Film density | g/cm² | 0.700 | 0.773 | 0.583 | 0.511 | 1.333 | 0.466 | 0.907 | 1.169 |
| | Film thickness | μm | 3.0 | 3.0 | 4.0 | 5.3 | 0.6 | 5.0 | 2.8 | 2.6 |
| | Matrix tensile strength (vertical) | MPa | 182 | 162 | 179 | 104 | 180 | 139 | 200 | 180 |
| | Matrix tensile strength (lateral) | MPa | 192 | 171 | 178 | 147 | 90 | 148 | 195 | 240 |
| | Product of Matrix tensile strengths (vertical × lateral) | $10^4 \times$ (MPa)² | 3.50 | 2.77 | 3.19 | 1.52 | 1.62 | 2.05 | 3.90 | 4.32 |

TABLE 2-continued

| | Parameter | Unit | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|---|
| | Average pore size | μm | 0.410 | 0.443 | 0.412 | 0.414 | 0.211 | 0.164 | 0.262 | 0.243 |
| | Fibril/node area ratio | | 90/10 | 87/13 | 79/21 | 65/35 | 72/28 | 59/41 | 93/7 | 95/5 |
| | Contact angle with electrolyte | (Degrees) | 44 | 42 | 38 | 48 | 55 | 77 | 52 | 57 |
| Physical properties of electrolyte membrane | Vertical strength (Dry tensile (25° C., 50%)) | (Mpa) | 37.3 | 46.3 | 42.0 | 25.8 | 31.3 | 33.4 | 41.4 | 47.0 |
| | Lateral strength, (Dry tensile (25° C., 50%)) | (Mpa) | 34.9 | 43.1 | 37.2 | 21.7 | 27.8 | 30.7 | 39.8 | 44.1 |
| | Vertical dimensional change (80° C., immersed in hot water) | (%) | 12.1 | 6.3 | 9.0 | 22.3 | 17.4 | 18.5 | 9.9 | 5.3 |
| | Lateral dimensional change (80° C., immersed in hot water) | (%) | 10.8 | 4.3 | 7.2 | 16.9 | 13.2 | 12.1 | 6.5 | 4.0 |
| | Membrane resistance | (mΩ) | 10.3 | 9.7 | 11.3 | 10.1 | 10.5 | 11.5 | 10.9 | 11.0 |

The SEM images of the biaxially stretched porous films actually obtained in Examples 1 to 3 and Comparative Examples 1 to 3 were as shown in FIG. 12 to FIG. 17, respectively.

Known techniques of increasing the tensile strength of a film include, for example, increasing the stretch ratio to increase the amount of fibrillated matter and using a high molecular weight material.

Comparative Example 2 is an example in which the stretch ratio was increased to improve the strength. However, the structure becomes denser as the thickness becomes thinner and the film pore size also becomes smaller. Thus, the problems to be solved by the present invention are not solved.

Comparative Example 3 is an example in which a high molecular weight material was used. However, the effect of improving the strength by a high molecular weight material was smaller than that of Examples 1 to 3. Many fine fibers occurred and the film pore size became smaller.

As is clear from the results of image analysis, Examples 1 to 3 suppress generation of non-stretched portions (nodes) of the PTFE in the stretching and increase the ratio of fibrillated PTFE, and thus can achieve high strength.

INDUSTRIAL APPLICABILITY

The polymer electrolyte membrane of the present invention can be suitably used as a solid polymer electrolyte membrane for polymer electrolyte fuel cells.

REFERENCE SIGNS LIST

1: Feeding roll for rolled film
2, 18: Take-up roll
3, 4, 5, 8, 9, 10, 11, 12: Roll
6, 7: Heat roll
13: Feeding roll for longitudinally stretched film
14: Pre-heating zone
15: Stretching zone
16: Heat-setting zone
17: Lamination roll

The invention claimed is:

1. A polymer electrolyte membrane comprising:
a porous film; and
a polymer electrolyte,
the porous film having a fibril/node area ratio of 90/10 to 75/25 and a contact angle with a solution of the polymer electrolyte of 44 degrees or smaller,
wherein the porous film having a film density of 0.80 g/cm$^3$ or lower,
wherein the polymer electrolyte is a fluoropolymer electrolyte, wherein the fluoropolymer electrolyte is a copolymer comprising
a repeating unit derived from a COOZ or SO$_3$Z group-containing monomer represented by the following formula (I):

$$CF_2=CF(CF_2)_k-O_1-(CFY^2)_m-A^1 \qquad (I)$$

wherein k is an integer of 0 to 2; 1 is 0 or 1; m is an integer of 0 to 12, if m=0, then 1=0, when m is an integer of 1 to 12, Y$^2$ is F or Cl and m Y$^2$s may be the same as or different from each other; A$^1$ is COOZ or SO$_3$Z, where Z is an alkali metal, an alkaline earth metal, hydrogen, or NR$^1$R$^2$R$^3$R$^4$, where R$^1$, R$^2$, R$^3$, and R$^4$ are each individually a C1-C3 alkyl group or hydrogen, and
a repeating unit derived from tetrafluoroethylene.

2. The polymer electrolyte membrane according to claim 1,
wherein the porous film has a product of vertical and lateral matrix tensile strengths of 2.20×10$^4$ MPa$^2$ or greater.

3. The polymer electrolyte membrane according to claim 1,
wherein the polymer electrolyte is filled into pores of the porous film, and the porous film is a polytetrafluoroethylene porous film prepared by stretching semi-sintered polytetrafluoroethylene and heat-setting the stretched semi-sintered polytetrafluoroethylene at a temperature of not lower than the melting point of sintered polytetrafluoroethylene.

4. The polymer electrolyte membrane according to claim 1, wherein the porous film has an average pore size of 0.05 µm or greater.

5. The polymer electrolyte membrane according to claim 1,
wherein the porous film has a thickness of smaller than 20 µm.

6. The polymer electrolyte membrane according to claim 1,
wherein the porous film is a polytetrafluoroethylene porous film and the polytetrafluoroethylene has a standard specific gravity of 2.160 or lower.

7. A membrane electrode assembly comprising the polymer electrolyte membrane according to claim 1.

8. A polymer electrolyte fuel cell comprising the membrane electrode assembly according to claim 7.

* * * * *